United States Patent
Ye et al.

(10) Patent No.: US 11,513,259 B1
(45) Date of Patent: Nov. 29, 2022

(54) GAS-SOLUBLE NANOVOIDED POLYMERS

(71) Applicant: META PLATFORMS TECHNOLOGIES, LLC, Menlo Park, CA (US)

(72) Inventors: Sheng Ye, Redmond, WA (US); Spencer Allan Wells, Seattle, WA (US); Andrew John Ouderkirk, Redmond, WA (US); Kenneth Diest, Kirkland, WA (US); Renate Eva Klementine Landig, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 792 days.

(21) Appl. No.: 16/524,631

(22) Filed: Jul. 29, 2019

(51) Int. Cl.
| | | |
|---|---|---|
| *G02B 1/12* | (2006.01) | |
| *G02B 1/04* | (2006.01) | |
| *G02B 27/01* | (2006.01) | |
| *B01L 5/00* | (2006.01) | |
| *C08L 83/04* | (2006.01) | |
| *C08L 29/04* | (2006.01) | |
| *C08L 75/04* | (2006.01) | |
| *C08L 27/16* | (2006.01) | |
| *C08L 23/08* | (2006.01) | |

(52) U.S. Cl.
CPC .............. *G02B 1/12* (2013.01); *B01L 5/00* (2013.01); *G02B 1/04* (2013.01); *G02B 27/0176* (2013.01); *B01L 2300/0645* (2013.01); *C08L 23/0846* (2013.01); *C08L 27/16* (2013.01); *C08L 29/04* (2013.01); *C08L 75/04* (2013.01); *C08L 83/04* (2013.01); *G02B 2027/0178* (2013.01)

(58) Field of Classification Search
CPC .... B01L 5/00; B01L 2300/0645; C08L 83/04; C08L 29/04; C08L 75/04; C08L 27/16; C08L 23/0846; G02B 1/12; G02B 1/04; G02B 27/0176; G02B 2027/0178
See application file for complete search history.

(56) References Cited

U.S. PATENT DOCUMENTS

2008/0014077 A1* 1/2008 Hopkins ............... F01D 11/122
 415/174.4
2015/0015120 A1* 1/2015 Kaimori ............... H01L 41/45
 428/314.2

OTHER PUBLICATIONS

Miriyev et al., "Soft material for soft actuators", Nature Communications, Department of Mechanical Engineering, vol. 8, No. 596, 2017, pp. 1-8.

(Continued)

*Primary Examiner* — Patrick D Niland
(74) *Attorney, Agent, or Firm* — FisherBroyles, LLP

(57) ABSTRACT

An actuator includes a primary electrode, a secondary electrode overlapping at least a portion of the primary electrode, a nanovoided polymer layer disposed between and abutting the primary electrode and the secondary electrode, the nanovoided polymer layer having a plurality of nanovoids dispersed throughout a polymer matrix, and a sealing layer at least partially encapsulating the nanovoided polymer layer, where the nanovoids include a fill gas.

20 Claims, 10 Drawing Sheets

(56) References Cited

OTHER PUBLICATIONS

Pilet et al., "Piezoelectricity enhancement of P(VDF/TrFE) by X-ray irradiation", Organic Electronics, vol. 37, 2016, pp. 257-262.
Liu et al., "Control of crystal morphology and its effect on electro-mechanical performances of electrostrictive P(VDF-TrFE-CTFE) terpolymer", European Polymer Journal, vol. 91, 2017, pp. 46-60.
Le et al., "All-organic electrostrictive polymer composites with low driving electrical voltages for micro-fluidic pump applications", Scientific Reports, 5:11814, 2015, pp. 1-13.
Xia et al., "PVDF-based dielectric polymers and their applications in electronic materials", IET Nanodielectrics, vol. 1, No. 1, 2018, pp. 17-31.
Wang et al., "Tactile-Sensing Based on Flexible PVDF Nanofibers via Electrospinning: A Review", Sensors, vol. 18, 330, 2018, pp. 1-16.
Stevens et al., "A Review of Adjustable lenses for Head Mounted Displays", International Society for Optics and Photonics, Proceedings of SPIE, vol. 10335, Digital Optical Technologies, Sep. 12, 2017, 20 pages.
Li et al., "Studies on the transformation process of PVDF from $\alpha$ to $\beta$ phase by stretching", RSC Advances, vol. 4, 2014, pp. 3938-3943.
Mohammadi et al., "Effect of tensile strain rate and elongation on crystalline structure and piezoelectric properties of PVDF thin films", Polymer Testing, vol. 26, 2007, pp. 42-50.
Lazarus et al., "Geometry-Induced Rigidity in Nonspherical Pressurized Elastic Shells", Physical Review Letters, vol. 109, No. 14, 2012, 6 pages.
Bonora et al., Active diffraction gratings: Development and tests, Review of Scientific Instruments, vol. 83, No. 12, Dec. 19, 2012, pp. 1-9.
"Manufacture of dichroics, areas of application and specifications", Technology, specifications and application of dichroic filters, URL: https://www.prinzoptics.de/en/technology-specifications-and-application-dichroic-filters, as accessed on 2018, pp. 1-24.
Kleinhans, W. A., "Aberrations of curved zone plates and Fresnel lenses", Applied Optics, vol. 16, No. 6, Jun. 1977, pp. 1701-1704.
Haertling, G. H., "Improved Hot-Pressed Electrooptic Ceramics in the (Pb,La)(Zr,Ti)O3 System", Journal of the American Ceramic Society, vol. 54, No. 6, Jun. 1971, pp. 1-19.
Jiang et al., "Transparent Electro-Optic Ceramics and Devices", Optoelectronic Devices and Integration, International Society for Optics and Photonics, Proceedings of SPIE, vol. 5644, 2004, 16 pages.
Kong et al., "Transparent Ceramic Materials", Transparent Ceramics, Topics in Mining, Metallurgy and Materials Engineering, 2015, pp. 29-91.

* cited by examiner

GAS-SOLUBLE NANOVOIDED POLYMERS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
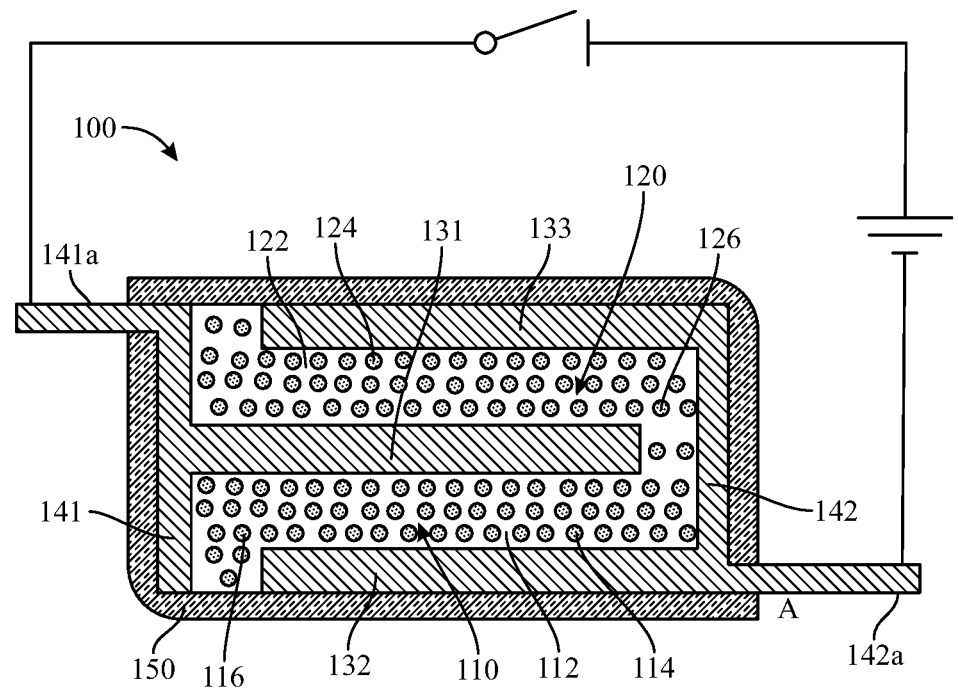
FIG. 1 is a schematic illustration of a gas-impregnated nanovoided polymer actuator according to some embodiments.
Figure 1:
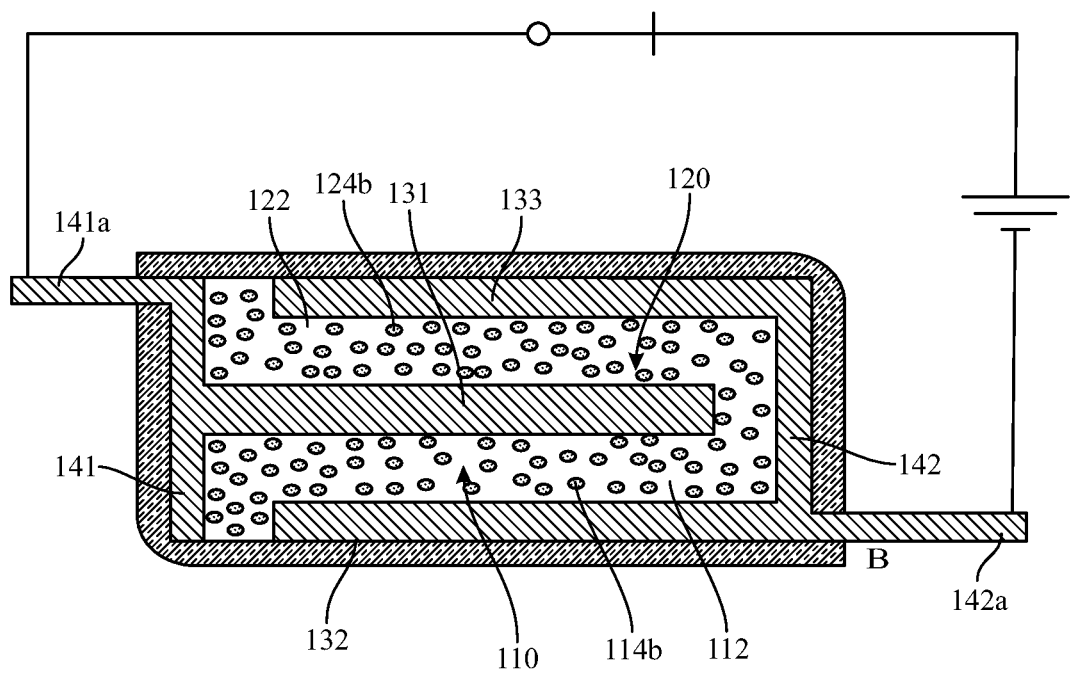

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be incorporated into a variety of different optic and electro-optic device architectures, including active and passive optics and electroactive devices. Electroactive polymer (EAP) materials, for instance, may change their shape under the influence of an electric field. EAP materials have been investigated for use in various technologies, including actuation, sensing and/or energy harvesting. Lightweight and conformable, electroactive polymers may be incorporated into wearable devices such as haptic devices and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. VR/AR eyewear devices and headsets may also be used for purposes other than recreation. For example, governments may use such devices for military training, medical professionals may use such devices to simulate surgery, and engineers may use such devices as design visualization aids.

These and other applications may leverage one or more characteristics of thin film polymer materials, including the refractive index to manipulate light and/or in the example of electroactive applications, the piezoelectric effect to generate a lateral deformation as a response to compression between conductive electrodes. In some embodiments, the electroactive response may include a mechanical response to an electrical input that varies over the spatial extent of the device, with the electrical input being applied by a control circuit to a layer of electroactive material located between paired electrodes. The mechanical response may be termed an actuation, and example devices may be, or include, actuators. In particular embodiments, a deformable optical element and an electroactive layer may be co-integrated whereby the optical element may itself be actuatable. Deformation of the electroactive polymer may be used to actuate optical elements in an optical assembly, such as a lens system. Notwithstanding recent developments, it would be advantageous to provide polymer materials having improved characteristics, including a controllable deformation response and/or a tunable refractive index.

The present disclosure is generally directed to the formation of nanovoided polymers (NVPs), and more particularly to gas-impregnated nanovoided polymers, as well as systems and devices incorporating such polymers. A nanovoided polymer actuator, for instance, may include an elastomeric polymer matrix disposed between conductive electrodes and a plurality of gas-filled voids distributed throughout the polymer matrix. Example fill gases include, but are not limited to, Ar, $N_2$, Kr, Xe, $O_2$, $SF_6$, $CHF_3$, $CF_4$, $C_2F_6$, $C_3F_8$, air, and the like. Applicants have shown that various fill gases may suppress hysteresis and creep of the polymer that may be associated with repeated actuation, while increasing resistance to dielectric breakdown, thus improving dependability and lifetime of the device. The actuator may be hermetically sealed to inhibit the ingress of environmental contamination, including moisture and solid particulates. Sealing compositions may include polymers such as poly(vinyl acetate), poly(vinyl alcohol), poly(ethylene vinyl alcohol), polyurethane, polyvinylidene fluoride, poly-chloro-trifluoroethylene, polyhedral oligomeric silsesquioxane, chloro-fluoropolymers, and aliphatic or semi-aromatic polyamides, and the like.

The fill gas may be readily soluble in the polymer matrix but substantially insoluble in the sealing composition such that, during actuation, the fill gas may exit and reenter the voids as well as the polymer matrix. In certain embodiments, the sealed actuator may include a gas reservoir configured to reversibly contain gas that is expelled from the polymer. According to some embodiments, a hermetically sealed actuator may beneficially resist the adverse effects of moisture, as well as solid and other liquid or gaseous contamination, which may improve device reliability and performance.

In contrast to traditional optical materials that may have either a static index of refraction or an index that can be switched between two static states, nanovoided polymers represent a class of optical materials where the index of refraction can be tuned over a range of values to advantageously control the interaction of these materials with light.

In accordance with various embodiments, a nanovoided polymer material may include a polymer matrix and a plurality of at least partially gas-filled nanoscale voids dispersed throughout the matrix. The polymer matrix material may include a deformable, electroactive polymer that may be symmetric with regard to electrical charge (e.g., polydimethylsiloxane (PDMS), acrylates, etc.) or asymmetric (e.g., poled polyvinylidene fluoride (PVDF) or its copolymers such as poly(vinylidenefluoride-co-trifluoroethylene) (PVDF-TrFE)). Such materials, according to some embodiments, may have a dielectric constant or relative permittivity, such as, for example, a dielectric constant ranging from approximately 1.2 to approximately 30.

As used herein, "electroactive polymers" may, in some examples, refer to polymers that exhibit a change in size or shape when stimulated by an electric field. Some electroactive polymers may find limited applications due to a low breakdown voltage with respect to the operating voltage used by electroactive devices (e.g., actuators). Electroactive devices with reduced operating voltages and higher energy densities may be useful for many applications.

The physical origin of the compressive nature of electroactive polymers in the presence of an electrostatic field (E-field), being the force created between opposite electric charges, is that of the Maxwell stress, which is expressed mathematically with the Maxwell stress tensor. The level of strain or deformation induced by a given E-field is dependent on the square of the E-field strength, the dielectric constant of the electroactive polymer, and on the elastic compliance of the material in question. Compliance in this case is the change of strain with respect to stress or, equivalently, in more practical terms, the change in displacement with respect to force.

As used herein, an "elastomer" or "elastomeric" material may, in some examples, refer to a material with viscoelasticity (i.e., both viscosity and elasticity), generally low elastic modulus (a measure of the stiffness of a solid material), and high failure strain compared with other materials. In some embodiments, an electroactive polymer may include an elastomer material that has an effective Poisson's ratio of less than approximately 0.35 (e.g., less than approximately 0.3, less than approximately 0.25, less than approximately 0.2, less than approximately 0.15, less than approximately 0.1, or less than approximately 0.05, including ranges between any of the foregoing values). In at least one example, the elastomer material may have an effective density that is less than approximately 90% (e.g., less than approximately 80%, less than approximately 70%, less than approximately 60%, less than approximately 50%, less than approximately 40%) of the elastomer when densified (e.g., when the elastomer is compressed, for example, by an applied voltage to make the elastomer more dense). An "effective density" may, in some examples, be determined as the density of a nanovoided material divided by the density of an equivalent volume of un-voided material.

Example polymer materials forming electroactive polymers may include, without limitation, styrenes, polyesters, polycarbonates, epoxies and/or halogenated polymers. Additional example nanovoided polymer materials include silicone-based polymers, such as poly(dimethyl siloxane), and acrylic polymers, such as ethyl acrylate, butyl acrylate, octyl acrylate, ethoxyethoxy ethyl acrylate, chloromethyl acrylate, methacrylic acid, dimethacrylate oligomers, allyl glycidyl ether, fluorinated acrylates, cyanoacrylate or N-methylol acrylamide. Further example nanovoided polymer materials may include silicone acrylate polymers, and urethane polymers, as well as mixtures of the foregoing. The nanovoided polymer may be an elastomer or a thermoset polymer, for example.

As used herein the terminology "nanovoids," "nanoscale voids," "nanovoided," and the like, may refer to voids having at least one sub-micron dimension, i.e., a length and/or width and/or depth, of less than 1000 nm. In some embodiments, the void size may be between approximately 10 nm and approximately 1000 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, or approximately 1000 nm, including ranges between any of the foregoing values).

In example nanovoided polymers, the nanovoids may be randomly distributed throughout the polymer matrix, without exhibiting any long-range order, or the nanovoids may exhibit a regular, periodic structure having a regular repeat distance of approximately 20 nm to approximately 1000 nm. In both disordered and ordered structures, the nanovoids may be discrete, closed-celled voids, open-celled voids that may be at least partially interconnected, or combinations thereof. For open-celled voids, the void size (d) may be the minimum average diameter of the cell. The voids may be any suitable size and, in some embodiments, the voids may approach the scale of the thickness of a nanovoided polymer layer.

In certain embodiments, the nanovoids may occupy approximately 1% to approximately 90% by volume of the nanovoided polymer matrix, e.g., approximately 1%, approximately 2%, approximately 5%, approximately 10%, approximately 20%, approximately 30%, approximately 40%, approximately 50%, approximately 60%, approximately 70%, approximately 80%, or approximately 90%, including ranges between any of the foregoing values.

According to some embodiments, the nanovoids may be substantially spherical, although the void shape is not particularly limited. For instance, in addition to, or in lieu of spherical voids, the nanovoided polymer material may include voids that are oblate, prolate, lenticular, ovoid, or any other regular or irregular form, etc., and may be characterized by a convex and/or a concave cross-sectional shape. The void shape may be isotropic or anisotropic. Moreover, the topology of the voids throughout the polymer matrix may be uniform or non-uniform.

As used herein "topology" with reference to the nanovoids refers to their overall arrangement within the nanovoided polymer matrix and may include their size and shape as well as their respective distribution (density, periodicity, etc.) throughout the polymer matrix. According to various embodiments, nanovoids may be distributed homogeneously or non-homogeneously. In certain embodiments, the nanovoided polymer may have a "spatially-varying topology" whereby at least one topological feature may change as a function of position. By way of example, the size of the voids and/or the void size distribution may vary spatially within the nanovoided polymer material, i.e., laterally and/or with respect to a thickness of a nanovoided polymer layer. In a similar vein, a nanovoided polymer thin film may have a constant density of nanovoids or the density of nanovoids may increase or decrease as a function of position, e.g., thickness. Adjusting the void fraction of an EAP, for instance, can be used to tune its compressive stress-strain characteristics.

In some embodiments, the nanovoids may be at least partially filled with a gas. A gas may be incorporated into the nanovoids to suppress electrical breakdown of an electroactive polymer element (for example, during capacitive actuation). The gas may include argon, nitrogen, krypton, xenon, oxygen, sulfur hexafluoride, an organofluoride, air and/or any other suitable gas. In some embodiments, such a gas may have a high dielectric strength. In some embodiments, the gas composition may be selected to tune the optical and mechanical properties of the nanovoided polymer, including the scattering, reflection, absorption, and/or transmission of light.

A sealing layer may be formed over the gas-impregnated nanovoided polymer to inhibit loss of the fill gas and/or limit exposure of the nanovoided polymer to various sources of contamination, including solid particulates such as dust, and liquids such as water. In various embodiments, the sealing layer may be transparent and/or translucent, thin, flexible, impermeable, non-toxic, and configured to form a hermetic barrier. In embodiments, the sealing layer may include an organic layer, such as an elastomer, or an inorganic layer, such as a glass composition.

The sealing layer, in certain embodiments, may have an optical transmissivity of at least approximately 50%, e.g., approximately 50%, approximately 60%, approximately 70%, approximately 80%, approximately 90%, approximately 95%, approximately 97%, approximately 98%, or approximately 99%, including ranges between any of the foregoing values, and may be formed to a thickness effective to substantially inhibit the transpiration of moisture.

A "flexible" sealing layer may be capable of exhibiting, without breaking or spalling, a bend radius of less than approximately 1 meter, e.g., less than 1, 0.5, 0.2, 0.1 or 0.05 m. The bend radius of an example sealing layer may be less than approximately 30, 20, 10, 5, 2 or 1 cm, for example. In further embodiments, the bend radius of a flexible sealing layer may be less than approximately 1 cm, e.g., less than 1, 0.5, 0.2, 0.1, 0.05 or 0.02 cm. An actuator including a flexible sealing layer, for example, can reliably operate for up to 200000 actuation cycles.

Reference herein to a "hermetic sealing layer" or "hermetic barrier" and the like may, in various examples, refer to a layer that is substantially airtight and substantially impervious to moisture. According to certain embodiments, a hermetic sealing layer may be configured to limit the transpiration (diffusion) of oxygen to less than approximately $10^{-2}$ cm$^3$/m$^2$/day (e.g., less than approximately $10^{-3}$ cm$^3$/m$^2$/day) and limit the transpiration (diffusion) of water to less than approximately $10^{-2}$ g/m$^2$/day (e.g., less than approximately $10^{-3}$, $10^{-4}$, $10^{-5}$ or $10^{-6}$ g/m$^2$/day, including ranges between any of the foregoing values).

In accordance with various embodiments, a nanovoided polymer layer may be disposed between a primary electrode and a secondary electrode. According to some embodiments, an actuator may include a primary electrode, a secondary electrode overlapping at least a portion of the primary electrode, and a gas-impregnated nanovoided polymer layer disposed between and abutting the primary electrode and the secondary electrode. A sealing layer may be formed over the actuator to inhibit the egress of the fill gas and the ingress of contaminants such as moisture.

In some embodiments, the application of a voltage to a nanovoided polymer layer may change the internal pressure of gasses within the nanovoided regions thereof. In this regard, gasses may diffuse either into or out of the nanovoided polymer matrix during dimensional changes associated with its deformation. Such changes in void topology can affect, for example, the hysteresis of an electroactive device incorporating the electroactive polymer during dimensional changes, and also may result in drift when the nanovoided polymer layer's dimensions are rapidly changed. Capacitive actuation, mechanical actuation, or actuation of the nanovoided polymer layer by other methods may be used to reversibly manipulate the void topology.

In certain embodiments, the dielectric constant (k) of the nanovoided polymer may be increased by incorporating nanoparticles into the polymer matrix and/or into the nanovoids. Example high-k nanoparticles include barium titanate, $TiO_2$, $CeO_2$, $BaSrTiO_3$, $PbLaZrTiO_3$, $PbMgNbO_3$+$PbTiO_3$, $Ta_2O_3$, and $Al_2O_3$, as well as combinations thereof.

In some embodiments, the nanovoided polymer material may include an elastomeric polymer matrix having an elastic modulus of less than approximately 10 GPa (e.g., approximately 10 GPa, approximately 5 GPa, approximately 2 GPa, approximately 1 GPa, approximately 0.5 GPa, approximately 0.2 GPa, approximately 0.1 GPa, or approximately 0.05 GPa, approximately 0.01 GPa, approximately 0.005 GPa, approximately 0.001 GPa, including ranges between any of the foregoing values).

Polymer materials including voids having nanoscale dimensions may possess a number of advantageous attributes. For example, nanovoided polymers may exhibit a higher transmission of visible light than their larger voided counterparts. Also, the incorporation of nanovoids into a polymer matrix may augment the permittivity of the resulting composite. Furthermore, the high surface area-to-volume ratio associated with nanovoided polymers will provide a greater interfacial area between the nanovoids and the surrounding polymer matrix. With such a high surface area structure, electric charge can accumulate at the void-matrix interface, which can enable greater polarizability and, consequently, increased permittivity ($\varepsilon_r$) of the composite. Additionally, because ions, such as plasma electrons, can only be accelerated over small distances within voids having nanoscale dimensions, the likelihood of molecular collisions that liberate additional ions and create a breakdown cascade is decreased, which may result in the nanovoided material exhibiting a greater breakdown strength than un-voided or even macro-voided polymers. In some embodiments, an ordered nanovoid architecture may provide a controlled deformation response, while a disordered nanovoided structure may provide enhanced resistance to crack propagation and thus improved mechanical durability.

Methods of forming a nanovoided polymer and a nanovoided polymer-containing actuator may include depositing a polymer precursor composition containing a curable material and a solvent onto a substrate, curing the polymer precursor to form a polymer matrix, selectively removing the solvent from the polymer matrix to form a nanovoided polymer, and introducing a fill gas into the nanovoids. A sealing layer may be formed over the gas-filled nanovoided polymer to at least partially encapsulate the polymer.

The curable material may include silicones (including those based on polydimethyl siloxanes), acrylates (including polymethyl methacrylate, ethyl acrylate, butyl acrylate, di-, tri-, and poly functional acrylates for crosslinkers), styrenes, urethanes, polyesters, polycarbonates, epoxies, halogenated polymers, imides, olefins, homopolymers, copolymers, block copolymers, and combinations thereof. Example solvents include water and other organic compounds such as alcohols, ketones, esters, ethers, aliphatic organic solvents, and the like, including mixtures thereof.

According to some embodiments, in addition to a solvent and a curable material, the polymer precursor composition may include one or more of a porogen, polymerization initiator, surfactant, emulsifier, and/or other additive(s) such as cross-linking agents. In some embodiments, various components of the polymer precursor composition may be combined into a single mixture and deposited simultaneously. Alternatively, the various components may be deposited individually (i.e., in succession), or in any suitable combination(s).

The deposited polymer precursor composition may form a precursor coating on the substrate, which may be cured to cross-link and polymerize the curable material. A curing source such as a light source or a heat source, for example, may be used to process the mixture and may include an energized array of filaments that may generate energy to sufficiently heat the curable material. According to some embodiments, the precursor coating thickness may range from approximately 10 nm to approximately 10 millimeters, e.g., approximately 10 nm, approximately 20 nm, approximately 50 nm, approximately 100 nm, approximately 200 nm, approximately 500 nm, approximately 1000 nm, approximately 2000 nm, approximately 5000 nm, approximately 10 micrometers, approximately 20 micrometers, approximately 50 micrometers, approximately 100 micrometers, approximately 200 micrometers, approximately 500 micrometers, approximately 1000 micrometers, approximately 2000 micrometers, approximately 5000 micrometers, or approximately 10000 micrometers, including ranges between any of the foregoing values.

In some embodiments, polymerization may be achieved by exposing the precursor coating to heat or actinic radiation. In some examples, "actinic radiation" may refer to energy capable of breaking covalent bonds in a material. Examples include electrons, electron beams, x-rays, gamma rays, ultraviolet and visible light, and ions at appropriately high energy levels. By way of example, a single UV lamp or a set of UV lamps may be used as a source for actinic radiation. When using a high lamp power, the curing time may be reduced. Another source for actinic radiation may include a laser (e.g., a UV, IR, or visible laser) or light emitting diode (LED).

Additionally or alternatively, a heat source such as a heat lamp may generate heat to initiate reaction between monomers, monomer initiators, and/or cross-linking agents. The monomers, monomer initiators, and/or cross-linking agents may react upon heating and/or actinic radiation exposure to form a polymer as described herein.

In some embodiments, polymerization may be free radical initiated. Free radical initiation may be performed by exposure to actinic radiation or heat. In addition to, or in lieu of, actinic radiation and heat-generated free radicals, polymerization of the nanovoided polymer may be atom transfer radical initiated, electrochemically initiated, plasma initiated, or ultrasonically initiated, as well as combinations of the foregoing. In certain embodiments, example additives to the polymer precursor composition that may be used to induce free radical initiation include azo compounds, peroxides, and halogens.

In some embodiments, a polymerization catalyst may be used. Example polymerization catalysts, which may be incorporated into the polymer precursor composition, include, hydrosilylation catalysts, polyamines, sulfur, styrenes, epoxies, isocyanates, and higher fatty acids or their esters, as well as combinations thereof.

According to some embodiments, curing of the precursor coating may be performed during a deposition step, or curing may be performed after depositing one or more layers. In some embodiments, the polymerization process may not be limited to a single curing step. Rather, it may be possible to carry out polymerization by two or more steps, whereby, as an example, the precursor coating may be exposed to two or more lamps of the same type or two or more different lamps in sequence. The curing temperature of different curing steps may be the same or different. The lamp power and dose from different lamps may also be the same or different. In one embodiment, the polymerization may be carried out in air; however, polymerizing in an inert gas atmosphere such as nitrogen or argon is also contemplated.

In various aspects, the curing time may depend on the reactivity of the precursor coating, the thickness of the precursor coating, the type of polymerization initiator and the dose if actinic radiation, for example. The curing time may be approximately less than 5 minutes, less than 3 minutes, or less than 1 minute. In another embodiment, short curing times of less than 30 seconds may be used for mass production.

As will be appreciated, curing of the deposited layer may additionally induce phase separation between the nascent polymer layer and the liquid solvent. In a further processing step, the liquid solvent, which may be segregated into discrete regions, may be removed from the polymer matrix to form voids, i.e., in regions previously occupied by the liquid solvent. In some embodiments, a change in temperature or pressure may be used to evaporate the solvent from the polymer matrix. In some embodiments, as will be appreciated by those skilled in the art, the liquid solvent may be removed from the cross-linked polymer by supercritical fluid extraction. Example materials that may be used for supercritical fluid extraction include carbon dioxide, methanol, ethanol, acetone, nitrous oxide, and water, as well as combinations thereof. For instance, carbon dioxide may be combined with methanol and/or ethanol as co-solvents.

In certain embodiments, the liquid solvent may form an emulsion with one or more components of the polymer precursor composition, e.g., during curing, and the emulsion may be removed from the cross-linked polymer to form nanovoids. In some embodiments, a change in temperature and/or pressure may be used to liberate the emulsified material from the polymer matrix.

Example methods for forming an emulsion include high pressure homogenization, ultrasonication, water dilution, an increase (decrease) in temperature to above (below) a phase inversion temperature of the polymer precursor composition, and/or a change in concentration of the polymer precursor composition to achieve an emulsion inversion point. An emulsion may be formed using low or high energy methods, i.e., by exposure to an energy source having an output power density of from approximately $10^3$ W/kg to approximately $10^{10}$ W/kg, e.g., $10^3$ W/kg, $10^4$ W/kg, $10^5$ W/kg, $10^6$ W/kg, $10^7$ W/kg, $10^8$ W/kg, $10^9$ W/kg, or $10^{10}$ W/kg, including ranges between any of the foregoing values.

In some embodiments, an emulsion may be formed prior to depositing the polymer precursor composition. In some embodiments, an emulsion may be formed by treating the precursor coating, i.e., after depositing the polymer precursor composition.

In addition to the foregoing, various manufacturing methods may be used to form nanovoided polymer materials, such as nanovoided polymer thin films having a disordered arrangement of nanovoids or an ordered arrangement of nanovoids. Methods for forming nanovoided polymer thin films having randomly-distributed (i.e., disordered) voids include selectively depositing a polymer composition or a polymeric precursor composition to form voids in situ, or depositing a polymer or polymeric precursor composition containing a templating agent and then selectively removing the templating agent, while a regular (i.e., ordered) arrangement of voids may be formed by self-assembly or various lithography techniques.

As disclosed herein, dynamic processing may be used to form nanovoided polymer materials having a void topology that varies as a function of position, e.g., laterally or as a function of thickness. That is, according to various embodiments, one or more process conditions may be changed during the act of depositing in order to control the architecture as well as the associated properties of the nanovoided polymer layers.

The nanovoided polymer layers disclosed herein may be incorporated into various devices. According to certain embodiments, a device may include a primary electrode, a secondary electrode overlapping at least a portion of the primary electrode, and a gas-impregnated nanovoided polymer layer disposed between and abutting the primary electrode and the secondary electrode. A sealing layer may at least partially envelope the nanovoided polymer layer.

In accordance with various embodiments, an example method includes (i) forming an actuator comprising a primary electrode, a secondary electrode overlapping at least a portion of the primary electrode, and a nanovoided polymer layer disposed between and abutting the primary electrode and the secondary electrode, (ii) introducing a fill gas into nanovoids of the nanovoided polymer layer, and (iii) forming a sealing layer over the gas-filled nanovoided polymer layer.

The electrodes (e.g., the primary electrode and the secondary electrode) may include one or more electrically conductive materials, such as a metal, a semiconductor (e.g., a doped semiconductor), carbon nanotubes, graphene, oxidized graphene, fluorinated graphene, hydrogenated graphene, other graphene derivatives, carbon black, transparent conductive oxides (TCOs, e.g., indium tin oxide (ITO), zinc oxide (ZnO), etc.), or other electrically conducting materials. In some embodiments, the electrodes may include a metal such as aluminum, gold, silver, platinum, palladium, nickel, tantalum, tin, copper, indium, gallium, zinc, alloys thereof, and the like. Further example transparent conductive oxides include, without limitation, aluminum-doped zinc oxide, fluorine-doped tin oxide, indium-doped cadmium oxide, indium zinc oxide, indium gallium tin oxide, indium gallium zinc oxide, indium gallium zinc tin oxide, strontium vanadate, strontium niobate, strontium molybdate, calcium molybdate, and indium zinc tin oxide.

In some embodiments, the electrodes (e.g., the primary electrode and the secondary electrode) may have a thickness of approximately 1 nm to approximately 1000 nm, with an example thickness of approximately 10 nm to approximately 50 nm. Some of the electrodes may be designed to allow healing of electrical breakdown (e.g., associated with the electric breakdown of elastomeric polymer materials). A thickness of an electrode that includes a self-healing material (e.g., a graphene electrode) may be approximately 20 nm. In some embodiments, a common electrode may be shaped to allow compression and expansion of an electroactive device during operation.

The electrodes in some configurations may be configured to stretch elastically. In such embodiments, the electrodes may include TCOs, graphene, carbon nanotubes, and the like. In other embodiments, relatively rigid electrodes (e.g. electrodes including a metal such as aluminum) may be used. The electrode, i.e., the electrode material, may be selected to achieve a desired deformability, transparency, and optical clarity for a given application. By way of example, the yield point of a deformable electrode may occur at an engineering strain of at least 0.5%.

The electrodes (e.g., the primary electrode and the secondary electrode) may be fabricated using any suitable process. For example, the electrodes may be fabricated using physical vapor deposition (PVD), chemical vapor deposition (CVD), evaporation, spray-coating, spin-coating, atomic layer deposition (ALD), and the like. In another aspect, the electrodes may be manufactured using a thermal evaporator, a sputtering system, a spray coater, a spin-coater, etc.

In some embodiments, one or more electrodes may be electrically interconnected, e.g., through a contact layer, to a common electrode. In some embodiments, an electroactive device may have a first common electrode connected to a first plurality of electrodes, and a second common electrode connected to a second plurality of electrodes. In some embodiments, electrodes (e.g., one of a first plurality of electrodes and one of a second plurality of electrodes) may be electrically isolated from each other using an insulator, such as a dielectric layer.

An insulator may include a material without appreciable electrical conductivity, and may include a dielectric material, such as, for example, an acrylate or silicone polymer. In some embodiments, an electrode (or other electrical connector) may include a metal. In some embodiments, an electrode (such as an electrical contact) or an electrical connector may include a similar material to other similar components.

The application of a voltage between the electrodes can cause compression of the intervening nanovoided polymer layer(s) in the direction of the applied electric field and an associated expansion or contraction of the polymer layer(s) in one or more transverse dimensions. In some embodiments, an applied voltage (e.g., to the primary electrode and/or the secondary electrode) may create at least approximately 0.1% strain (e.g., an amount of deformation in the direction of the applied force resulting from the applied voltage divided by the initial dimension of the material) in the gas-impregnated electroactive polymer element(s) in at least one direction (e.g., an x, y, or z direction with respect to a defined coordinate system).

In some embodiments, a first electrode may overlap (e.g., overlap in a parallel direction) at least a portion of a second electrode. The first and second electrodes may be generally parallel and spaced apart. A third electrode may overlap at least a portion of either the first or second electrode. An actuator may include a first nanovoided polymer (e.g., an elastomer material) and may be disposed between a first pair of electrodes (e.g., the first electrode and the second electrode). The actuator may further include a second elastomer material, which may be disposed between a second pair of electrodes (e.g., the first electrode and the third electrode). In some embodiments, there may be an electrode that is common to both the first pair of electrodes and the second pair of electrodes.

In some embodiments, a common electrode may be electrically coupled (e.g., electrically contacted at an interface having a low contact resistance) to one or more other electrodes, e.g., a second electrode and a third electrode located on either side of a first electrode. In some embodiments, an electroactive device may include additional electroactive elements interleaved between electrodes, for example in a stacked configuration. For example, electrodes may form an interdigitated stack of electrodes, with alternate electrodes connected to a first common electrode and the remaining alternate electrodes connected to a second common electrode.

In some applications, an electroactive device used in connection with the principles disclosed herein may include a first electrode, a second electrode, and a gas-impregnated nanovoided polymer layer disposed between the first electrode and the second electrode. The gas-impregnated nanovoided polymer may include a polymer matrix and a plurality of gas-filled voids distributed throughout the matrix. Voids may be generally isolated from each other, or, at least in part, interconnected through an open-cell structure. The plurality of voids may have a uniform or non-uniform distribution within the polymer layer, and the electroactive device may have a uniform or non-uniform electroactive response when an electrical signal is applied between the first electrode and the second electrode, based on the uniform or non-uniform distribution of voids. A sealing layer may be formed over the electroactive device. According to certain embodiments, one or more of the electrodes, including one or more of the common electrodes, may extend through the sealing layer to enable electrical connections to be made thereto.

In certain embodiments, the fill gas may be readily soluble in the nanovoided polymer matrix yet substantially insoluble in the sealing layer. In various examples, a difference in Hildebrand solubility parameter between the fill gas and the nanovoided polymer may be less than 2 MPa$^{1/2}$, whereas a difference in Hildebrand solubility parameter between the fill gas and the sealing layer may be at least 5 MPa$^{1/2}$.

In certain embodiments, the nanovoids may be distributed uniformly or non-uniformly throughout the polymer matrix. A non-uniform distribution of voids may include a spatial variation in at least one of void diameter, void volume, void number density, void volume fraction, or void orientation (e.g., in the case of anisotropic voids). A non-uniform distribution of voids within an electroactive element may include a functional dependence on a distance parameter, such as a distance from an edge and/or center of an electroactive element.

A non-uniform electroactive response may include a first deformation of a first portion of the electroactive device that differs from a second deformation of a second portion of the electroactive device. A deformation may include a compression (for example, parallel to an applied electric field), change in curvature, or other change in a dimensional parameter, such as length, width, height, and the like, in one or more directions. An electroactive device may have a first deformation associated with the application of a first voltage between the first and second electrodes, and a second deformation associated with the application of a second voltage between the first and second electrodes, with the first and second deformations being appreciably different. An electrical signal may include a potential difference, which may include a direct or alternating voltage.

By way of example, an electroactive element may have a generally rectangular shape with a generally uniform thickness. In some embodiments, the volume fraction of voids may increase monotonically along a direction parallel to a longer side and/or a shorter side of the rectangular shape. In some examples, the void volume fraction may have a highest value in some portion of the electroactive element and decrease from the highest portion to portions with lower void volume fractions elsewhere, for example proximate an edge. In some examples, the void volume fraction may have a lowest value in some portion of the electroactive element and increase from the lowest portion to portions with higher void volume fractions elsewhere, for example proximate an edge of the electroactive element.

According to further embodiments, an electroactive element may have a disk shape. The volume fraction of voids may vary as a function of a radial distance from the disk center. In some embodiments, the volume fraction may be highest in a central portion of a disk-shaped electroactive element and decrease along a radial direction to an edge. In some embodiments, the volume fraction may be lowest in a central portion and increase along a radial direction to an edge. The variation in void volume fraction may have a functional relationship with a distance parameter, for example including one or more of a linear, quadratic, sinusoidal, undulating, parabolic, or other functional relationship with a distance parameter along one or more of the relevant distance parameters. For example, a distance parameter may be determined as the distance along an edge, obliquely across, from a center, or other distance measurement for a given electroactive element.

In some embodiments, an electroactive device may include a first electrode, a second electrode, a gas-filled nanovoided polymer layer located between the first electrode and the second electrode, and a sealing layer arranged peripheral to the polymer layer and electrodes. The electroactive device may be configured to operate as an actuator or, in some embodiments, as a sensor. Application of a mechanical input to a portion of the electroactive device may generate an electric signal between the first electrode and the second electrode. The electrical response to a mechanical variation may vary over the electroactive device, with the magnitude being determined, at least in part, by the location of the mechanical input relative to the distribution of voids within the nanovoided polymer. The electroactive device may include a first portion and a second portion, for instance, where a first voltage generated by a mechanical input to the first portion may be appreciably different from a second voltage generated by a similar mechanical input to the second portion.

In some embodiments, the electroactive device may be a component of a wearable device. The wearable device may include a helmet or other headwear, an eyewear frame, a glove, a belt, or any device configured to be positioned adjacent to or proximate the body of a user, for example to support the electroactive device proximate a user when the user wears the wearable device, and the electroactive device may be configured to provide, for example, a tactile signal to the user.

The electroactive device may be configured to provide an electrical signal correlated with a configuration of a body part, such as a joint angle. For example, the electrical signal may be used to determine a joint angle of a finger portion, wrist, elbow, knee, ankle, toe, or other body joint, or the bend angle of a mechanical device. For example, the wearable device may be a glove, and the electroactive device may be configured to provide an electrical signal based, at least in part, on a joint angle within a hand of the user wearing the glove, such as the angle between portions of a finger. In some embodiments, a method includes generating an electroactive response in an electroactive device, the electroactive device including a gas-filled nanovoided polymer layer located between a first electrode and a second electrode, wherein the electroactive response to an electrical input or a mechanical input may vary appreciably over a spatial extent of the electroactive device due to a uniform or a non-uniform distribution of voids within the nanovoided polymer.

In some embodiments, the electroactive response may include an electrical signal having a characteristic indicative of a location of the mechanical input to the electroactive device, the electrical signal being measured between the first electrode and the second electrode. The electrical signal may be a termed sensor signal, and in some embodiments, the electroactive device may be, or include, a sensor. In some embodiments, an electroactive device may be used as both an actuator and a sensor. In some embodiments, the electroactive device may be supported against a hand of a user, and the electrical signal may be used to determine a gesture by the user, such as a finger movement. In some embodiments, typing inputs by a user, e.g., into a virtual keyboard, may be determined from sensor signals.

According to some embodiments, the frequency of alternating voltage may be selected to provide an appreciable haptic sensation on the skin of a user. In some embodiments, the frequency may be higher than the highest mechanical response frequency of the device, so that deformation may occur in response to the applied RMS electric field but with no appreciable oscillatory mechanical response to the applied frequency. The applied electrical signal may generate non-uniform constriction of the gas-impregnated nanovoided polymer layer between the first and second electrodes. A non-uniform electroactive response may include a curvature of a surface of the electroactive device, which may in some embodiments be a compound curvature.

Further to the foregoing, various fabrication methods are discussed herein. Various deposition methods, including spin-coating, inkjet printing, chemical vapor deposition, vapor coating, thermal spraying, extrusion, or lamination may be used to form a nanovoided polymer layer. In certain embodiments, a nanovoided polymer layer may be deposited directly onto an electrode. In certain embodiments, an electrode may be deposited directly onto a nanovoided polymer layer. In alternate embodiments, a nanovoided polymer layer may be deposited onto a provisional substrate and transferred to an electrode or an electroded substrate.

Properties of a nanovoided polymer layer may be varied across its spatial extent by varying one or more process parameters, such as wavelength, intensity, substrate temperature, other process temperature, gas pressure, application of additional radiation, chemical concentration gradients, chemical composition variations (e.g., to control micelle size), or other process parameter. Non-uniform void size distributions may be obtained, for example, by varying the size of sacrificial regions within a polymer layer.

Methods of forming an electroactive device include forming electrodes and nanovoided polymer layers sequentially (e.g., via vapor deposition, coating, printing, etc.) or simultaneously (e.g., via co-flowing, coextrusion, slot die coating, etc.). Alternatively, the nanovoided polymer layers may be deposited using initiated chemical vapor deposition (iCVD), where, for example, suitable monomers of the desired polymers may be used to form the desired coating. In some embodiments, monomers, oligomers, and/or prepolymers for forming the polymer may optionally be mixed with a solvent and the solvent may be removed from the polymer matrix during and/or following curing to form nanovoids.

A method of fabricating an electroactive device may include depositing a curable material onto a first electrode, curing the deposited curable material to form a nanovoided polymer layer and depositing an electrically conductive material onto a surface of the a nanovoided polymer layer opposite the first electrode to form a second electrode. In some embodiments, the cured material may have a Poisson's ratio of approximately 0.35 or less. In some embodiments, a method may further include depositing an additional curable material onto a surface of the second electrode opposite the nanovoided polymer layer, curing the deposited additional curable material to form a second a nanovoided polymer layer including a second cured elastomer material, and depositing an additional electrically conductive material onto a surface of the second a nanovoided polymer layer opposite the second electrode to form a third electrode.

In some embodiments, a method of fabricating a nanovoided polymer layer may include vaporizing a curable material, or a precursor thereof, where depositing the curable material may include depositing the vaporized curable material onto a first electrode. In some embodiments, a method of fabricating a nanovoided polymer layer may include printing the polymer or precursor thereof (such as a curable material) onto an electrode. In some embodiments, a method may also include combining a polymer precursor material with at least one other component to form a deposition mixture. In some embodiments, a method may include combining a curable material with particles of a material having a high dielectric constant to form a deposition mixture.

According to some embodiments, a method may include positioning a curable material between a first electrically conductive material and a second electrically conductive material. The positioned curable material may be cured to form a nanovoided polymer layer. In some embodiments, the cured material may have a Poisson's ratio of approximately 0.35 or less. In some embodiments, at least one of the first electrically conductive material or the second electrically conductive material may include a curable electrically conductive material, and the method may further include curing the at least one of the first electrically conductive material or the second electrically conductive material to form an electrode. In this example, curing the at least one of the first electrically conductive material or the second electrically conductive material may include curing the at least one of the first electrically conductive material or the second electrically conductive material during curing of the positioned curable material.

In some embodiments, a curable material and at least one of a first electrically conductive material or a second electrically conductive material may be flowable during positioning of the curable material. A method of fabricating an electroactive device may further include flowing a curable material and at least one of the first electrically conductive material or the second electrically conductive material simultaneously onto a substrate.

In some embodiments, methods for fabricating an electroactive device (e.g., an actuator) may include masks (e.g., shadow masks) to control the patterns of deposited materials. In some embodiments, the electroactive device may be fabricated on a surface enclosed by a deposition chamber, which may be evacuated (e.g., using one or more mechanical vacuum pumps to a predetermined level such as $10^{-6}$ Torr or below). A deposition chamber may include a rigid material (e.g., steel, aluminum, brass, glass, acrylic, and the like). A surface used for deposition may include a rotating drum. In some embodiments, the rotation may generate centrifugal energy and cause the deposited material to spread more uniformly over any underlying sequentially deposited materials (e.g., electrodes, polymer layers, and the like) that are mechanically coupled to the surface. In some embodiments, the surface may be fixed and the deposition and curing systems may move relative to the surface, or both the surface, the deposition, and/or curing systems may be moving simultaneously.

In some embodiments, an electroactive device (e.g., an actuator, sensor, and the like) may be fabricated by: providing an electrically conductive layer (e.g., a first electrode) having a first surface; depositing (e.g., vapor depositing) a polymer (e.g., an electroactive polymer) or polymer precursor (such as a monomer) onto the electrically conductive layer; as needed, forming a polymer such as an electroactive polymer from the polymer precursor (e.g., by curing or a similar process); and depositing another electrically conductive layer (e.g., a second electrode) onto the electroactive polymer. In some embodiments, the method may further include repeating one or more of the above to fabricate additional layers (e.g., second electroactive element, other electrodes, and the like). An electroactive device may have a stacked configuration.

In some embodiments, an electroactive device may be fabricated by first depositing a first electrode, and then depositing a curable material (e.g., a monomer) on the first electrode (e.g., deposited using a vapor deposition process). In some embodiments, an inlet to a deposition chamber may open and may input an appropriate monomer initiator for starting a chemical reaction. In some embodiments, "monomer," as used herein, may refer to a monomer that forms a given polymer (i.e., as part of an electroactive element). In other examples, polymerization of a polymer precursor (such as a monomer) may include exposure to radiation (e.g., visible, UV, x-ray or gamma radiation), exposure to other radiation (e.g., electron beams, ultrasound), heat, exposure to a chemical species (such as a catalyst, initiator, and the like).

Deposited curable material may be cured with a source of radiation (e.g., electromagnetic radiation, such as UV and/or visible light) to form a nanovoided polymer layer that includes a cured elastomer material, for example by photopolymerization. In some embodiments, a radiation source may include an energized array of filaments that may generate electromagnetic radiation, a semiconductor device such as light-emitting diode (LED) or semiconductor laser, other laser, fluorescence or an optical harmonic generation source, and the like. A monomer and an initiator (if used) may react upon exposure to radiation to form a nanovoided polymer. In some embodiments, radiation may include radiation having an energy (e.g., intensity and/or photon energy) capable of breaking covalent bonds in a material. Further radiation examples may include electrons, electron beams, ions (such as protons, nuclei, and ionized atoms), x-rays, gamma rays, ultraviolet or visible light, or other radiation, e.g., having appropriately high energy levels. In some embodiments, the cured material may include at least one non-polymeric component in a plurality of defined regions and the method may further include removing at least a portion of the at least one non-polymeric component from the cured elastomer material to form a voided (e.g., nanovoided) polymer layer.

In some embodiments, a deposition chamber may have an exhaust port configured to open to release at least a portion of the vapor in the chamber during and/or between one or more depositions of the materials (e.g., monomers, oligomers, monomer initiators, conductive materials, etc.). In some embodiments, a deposition chamber may be purged (e.g., with a gas or the application of a vacuum, or both) to remove a portion of the vapor (e.g., monomers, oligomers, monomer initiators, metal particles, and any resultant by-products). Thereafter, one or more of the previous steps may be repeated (e.g., for a second electroactive element). In this way, individual layers of an electroactive device may be maintained at high purity levels.

In some embodiments, the deposition of materials (e.g., monomers, oligomers, monomer initiators, conductive materials, etc.) to form an electroactive device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on or proximate the substrate surface to produce the desired deposit (e.g., one or more electrodes, electroactive polymers, etc.). Frequently, volatile by-products are also produced, which may be removed by gas flow through the chamber.

In some embodiments, an electroactive device may be fabricated using an atmospheric pressure CVD (APCVD) coating formation technique (e.g., CVD at atmospheric pressure). In some embodiments, an electroactive device may be fabricated using a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one aspect, a fabrication apparatus may apply an ultrahigh vacuum CVD (UHVCVD) process (e.g., CVD at very low pressure, typically below approximately $10^{-6}$ Pa (equivalently, approximately $10^{-8}$ Torr)).

In some embodiments, an electroactive device may be fabricated using an aerosol assisted CVD (AACVD) process (e.g., a CVD process in which the precursors are transported to the electroactive device) by means of a liquid/gas aerosol, which may be generated ultrasonically or with electrospray. In some embodiments, AACVD may be used with non-volatile precursors. In some embodiments, an electroactive device may be fabricated using a direct liquid injection CVD (DLICVD) process (e.g., a CVD process in which the precursors are in liquid form, for example, a liquid or solid dissolved in a solvent). Liquid solutions may be injected in a deposition chamber towards one or more injectors. The precursor vapors may then be transported to the substrate as in CVD. DLICVD may be used on liquid or solid precursors, and high growth rates for the deposited materials may be reached using this technique.

In some embodiments, an electroactive device may be fabricated using a hot wall CVD process (e.g., CVD in which the deposition chamber is heated by an external power source and the electroactive device is heated by radiation from the heated wall of the deposition chamber). In another aspect, an electroactive device may be fabricated using a cold wall CVD process (e.g., a CVD process in which only the substrate is directly heated, for example, by induction, while the walls of the chamber are maintained at room temperature).

In some embodiments, an electroactive device may be fabricated using a microwave plasma-assisted CVD (MPCVD) process, where microwaves are used to enhance chemical reaction rates of the precursors. In another aspect, an electroactive device may be fabricated using a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the electroactive device or in depositing certain materials (e.g., organic materials and/or some polymers).

In some embodiments, an electroactive device may be fabricated using a remote plasma-enhanced CVD (RPECVD) process. In some embodiments, RPECVD may be similar to PECVD except that the deposited layer(s) may not be directly in the plasma discharge region. In some embodiments, the removal of the deposited layer(s) from the plasma region may allow for the reduction of processing temperatures down to room temperature.

In some embodiments, an electroactive device may be fabricated using an atomic-layer CVD (ALCVD) process. In some embodiments, ALCVD may deposit successive layers of different substances to produce layered, crystalline film coatings.

In some embodiments, an electroactive device may be fabricated using a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness) and nanomaterials, which may be used in forming the electroactive device.

In some embodiments, an electroactive device may be fabricated using a hot filament CVD (HFCVD) process, which may also be referred to as catalytic CVD (cat-CVD) or initiated CVD (iCVD). In some embodiments, this process may use a hot filament to chemically decompose the source gases to form the materials of the electroactive device. Moreover, the filament temperature and temperature of portions of the electroactive device may be independently controlled, allowing colder temperatures for better adsorption rates at the substrate, and higher temperatures necessary for decomposition of precursors to free radicals at the filament.

In some embodiments, an electroactive device may be fabricated using a hybrid physical-chemical vapor deposition (HPCVD) process. HPCVD may involve both chemical decomposition of a precursor gas and vaporization of a solid source to form the materials on a substrate.

In some embodiments, an electroactive device may be fabricated using a metalorganic chemical vapor deposition (MOCVD) process (e.g., a CVD process that uses metalorganic precursors) to form materials on the substrate. For example, an electrode may be formed on a nanovoided polymer layer using this approach.

In some embodiments, an electroactive device may be fabricated using a rapid thermal CVD (RTCVD) process. This CVD process uses heating lamps or other methods to rapidly heat the substrate. Heating only the substrate rather than the precursors or chamber walls may reduce unwanted gas-phase reactions that may lead to particle formation within the deposition chamber.

In some embodiments, an electroactive device may be fabricated using a photo-initiated CVD (PICVD) process. This process may use UV light to stimulate chemical reactions in the precursor materials used to make the materials for the electroactive device. Under certain conditions, PICVD may be operated at or near atmospheric pressure.

In some embodiments, electroactive devices may be fabricated by depositing a curable material (e.g., a monomer such as an acrylate or a silicone) and a solvent for the curable material onto a substrate, heating the curable material with at least a portion of the solvent remaining with the cured monomer, and removing the solvent from the cured monomer. Using this process, voids such as nanovoids may be formed in the polymer layer. In some embodiments, a flowable material (e.g., a solvent) may be combined with the curable materials (e.g., monomers and conductive materials) to create a flowable mixture that may be used for producing electroactive polymers with nanovoids. The monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene (EO) diacrylate, trifunctional materials such as trimethylolpropane triacrylate (TMPTA), and/or higher functional materials. Other types of monomers may be used, including, for example, isocyanates, and these may be mixed with monomers with different curing mechanisms.

In some embodiments, the flowable material may be combined (e.g., mixed) with a curable material (e.g., a monomer). In some embodiments, a curable material may be combined with at least one non-curable component (e.g., particles of a material having a high dielectric constant) to form a mixture including the curable material and the at least one non-curable component, for example, on an electrode (e.g., a first electrode or a second electrode) of the electroactive device. Alternatively, the flowable material (e.g., solvent) may be introduced into a vaporizer to deposit (e.g., via vaporization or, in alternative embodiments, via printing) a curable material onto an electrode. In some embodiments, a flowable material (e.g., solvent) may be deposited as a separate layer either on top or below a curable material (e.g., a monomer) and the solvent and curable material may be allowed to inter-diffuse before being cured to generate an electroactive polymer having nanovoids.

In some embodiments, after the curable material is cured, the solvent may be allowed to evaporate before another electroactive polymer layer or another electrode is formed. In some embodiments, the evaporation of the solvent may be accelerated by the application of heat to the surface with a heater, which may, for example, be disposed within a drum forming surface and/or any other suitable location, or by reducing the pressure of the solvent above the substrate using a cold trap (e.g., a device that condenses vapors into a liquid or solid), or a combination thereof. Isolators (not shown) may be added to the deposition chamber to prevent, for example, the solvent vapor from interfering with the radiation source or the electrode source.

In some embodiments, the solvent may have a vapor pressure that is similar to at least one of the monomers being evaporated. The solvent may dissolve both the monomer and the generated electroactive polymer, or the solvent may dissolve only the monomer. Alternatively, the solvent may have low solubility for the monomer, or plurality of monomers if there is a mixture of monomers being applied. Furthermore, the solvent may be immiscible with at least one of the monomers and may at least partially phase separate when condensed on the substrate.

In some embodiments, there may be multiple vaporizers, with each of the multiple vaporizers applying a different material, including solvents, non-solvents, monomers, and/or ceramic precursors such as tetraethyl orthosilicate and water, and optionally a catalyst for forming a sol-gel such as HCl or ammonia.

In some embodiments, a method of generating a nanovoided polymer for use in connection with an electroactive device (such as electroactive devices described variously herein) may include co-depositing a monomer or mixture of monomers, a surfactant, and a nonsolvent material associated with the monomer(s) which is compatible with the surfactant. In various examples, the monomer(s) may include, but not be limited to, ethyl acrylate, butyl acrylate, octyl acrylate, ethoxy ethyl acrylate, 2-chloroethyl vinyl ether, chloromethyl acrylate, methacrylic acid, allyl glycidyl ether, and/or N-methylol acrylamide. Other curing agents such as polyamines, higher fatty acids or their esters, and/or sulfur may be used as the monomer(s). In some aspects, the surfactant may be ionic or non-ionic. In another aspect, the non-solvent material may include organic and/or inorganic non-solvent materials. For instance, the non-solvent material may include water or a hydrocarbon or may include a highly polar organic compound such as ethylene glycol. As noted, the monomer or monomers, non-solvent, and surfactant may be co-deposited. Alternatively, the monomer or monomers, non-solvent, and/or surfactant may be deposited sequentially. In one aspect, a substrate temperature may be controlled to generate and control one or more properties of the resulting emulsion generated by co-depositing or sequentially depositing the monomer or monomers, non-solvent, and surfactant. The substrate may be treated to prevent destabilization of the emulsion. For example, an aluminum layer may be coated with a thin polymer layer made by depositing a monomer followed by curing the monomer.

Further to the disclosed methods for forming a nanovoided polymer as well as adjacent electrodes, a sealing layer may be formed over the electroded polymer architecture. In accordance with various embodiments, the sealing layer may be formed using physical vapor deposition (PVD), chemical vapor deposition (CVD), evaporation, spray-coating, spin-coating, atomic layer deposition (ALD), and the like, and may include any composition suitable to form a barrier that inhibits or prevents the ingress of contamination, including moisture, into the electroactive device. Example sealing layer compositions may include poly(vinyl acetate), poly(vinyl alcohol), poly(ethylene vinyl alcohol), polyurethane, polyvinylidene fluoride, polychloro-trifluoroethylene, polyhedral oligomeric silsesquioxane, chloro-fluoropolymers, and aliphatic or semi-aromatic polyamides.

As will be appreciated, the sealing layer may be formed after incorporating a fill gas into the nanovoided polymer layer(s). A fill gas may be introduced into a nanovoided polymer within the deposition chamber, i.e., before or after forming conductive electrodes. In an example method, a deposition chamber containing an electroded nanovoided polymer layer may be evacuated and backfilled with a fill gas. In certain embodiments, the fill gas may be incorporated (i.e., absorbed) into the nanovoids as well as into the polymer matrix. Example fill gases include, but are not limited to, Ar, $N_2$, Kr, Xe, $O_2$, $SF_6$, $CHF_3$, $CF_4$, $C_2F_6$, $C_3F_8$, and air.

According to some embodiments, the sealing layer may be formed directly over the nanovoided polymer. According to some embodiments, the sealing layer may be formed directly over the electrodes. According to some embodiments, the sealing layer may be displaced from one or both of the nanovoided polymer layer(s) and the electrode(s) to form an empty space, i.e., a gas reservoir, which may be configured to reversibly contain fill gas that is expelled from the polymer.

According to some embodiments, the gas reservoir may include a getter material, such as a moisture getter. A layer of getter material may be formed over an inner surface of the gas reservoir, such as over an exposed surface of an electrode. Example moisture getter materials include microporous polyimides and microporous polyamides, which may irreversibly absorb moisture contained within the gas reservoir.

While the gas-impregnated nanovoided materials of the present disclosure are described generally in connection with mechanical actuators, the nanovoided materials may be used in other fields. For example, the nanovoided polymers may be used, as part of, or in combination with passive and active optics, including a lens, mirror, holographic element, beam splitter, optical filter, optical retardation films, polarizers, compensators, reflective films, alignment layers, color filters, antistatic protection sheets, electromagnetic interference protection sheets, polarization-controlled lenses for autostereoscopic three-dimensional displays, and infrared reflection films, and the like.

An adjustable lens, for instance, may include any suitable type of lens with adjustable optical properties (e.g., adjustable optical power/focal length, correcting for wave-front distortion and/or aberrations, etc.), a liquid lens, a gel lens, or other adjustable lens. For example, an adjustable lens may include a deformable exterior layer filled with an optical medium such as a liquid or a semi-solid material (e.g., a gel, a semi-solid polymer, etc.). An adjustable lens may include one or more substantially transparent materials (at wavelengths of application) that may deform and/or flow under pressure.

A deformable optical element may include a substantially transparent and elastic material. For example, a deformable optical element may include a natural or synthetic elastomer that returns to a resting state when a deforming force is removed. In some embodiments, a deformable optical element may be deformed using an electroactive device generating a directly-driven force to produce a desired optical power or other optical property, e.g., for a lens or other optical element. In some embodiments, actuation forces may be applied around a perimeter of a deformable lens and may be generally uniform or variable around the perimeter of a lens. In some embodiments, electroactive devices may be used to actuate deformable optical elements in optical assemblies (e.g., lens systems).

In some embodiment, a lens assembly may include multiple deformable optical elements (e.g., multiple deformable lenses, such as liquid lenses), where the deformation is provided by one or more electroactive devices, in accordance with example embodiments of the disclosure.

According to some embodiments, an optical element may include a tunable lens and an electroded layer of a gas-impregnated nanovoided polymer disposed over a first surface of the tunable lens. The tunable lens may be a liquid lens, for example, and may have a geometry selected from prismatic, freeform, plano, meniscus, bi-convex, plano-convex, bi-concave, or plano-concave. In certain embodiments, a further optical element may be disposed over a second surface of the tunable lens. The optical element may be incorporated into a head mounted display, e.g., within a transparent aperture thereof.

In the presence of an electrostatic field (E-field), an electroactive polymer (i.e., a gas-impregnated nanovoided polymer) may deform (e.g., compress, elongate, bend, etc.) according to the magnitude and direction of the applied field. As the potential difference (i.e., voltage difference) between the electrodes is increased or decreased (e.g., from zero potential) the amount of deformation may also increase, principally along electric field lines. This deformation may achieve saturation when a certain electrostatic field strength has been reached. With no electrostatic field, the electroactive polymer may be in its relaxed state undergoing no induced deformation, or stated equivalently, no induced strain, either internal or external.

In accordance with various embodiments, liquid lenses can be used to enhance imaging system flexibility across a wide variety of applications that benefit from rapid focusing. According to certain embodiments, by integrating an actuatable liquid lens, an imaging system can rapidly change the plane of focus to provide a sharper image, independent of an object's distance from the camera. The use of liquid lenses may be particularly advantageous for applications that involve focusing at multiple distances, where objects under inspection may have different sizes or may be located at varying distances from the lens, such as package sorting, barcode reading, security, and rapid automation, in addition to virtual reality/augmented reality devices.

Further example structures that may be operated in conjunction with an electroactive device having a gas-impregnated layer of a nanovoided polymer include tunable prisms and gratings as well as tunable form birefringent structures, which may include either a patterned nanovoided polymer layer having a uniform porosity or an un-patterned nanovoided polymer layer having spatially variable porosity.

In some embodiments, the optical performance of a nanovoided polymer grating may be tuned through actuation of the grating, which may modify the pitch of the grating elements. In some embodiments, a fill gas-impregnated nanovoided polymer layer having a tunable refractive index may be incorporated into an actively switchable optical waveguide. According to some embodiments, one or more optical properties of an optical element may be tuned through capacitive actuation, mechanical actuation, and/or acoustic actuation. According to some embodiments, one or more properties of a nanovoided polymer layer may be tuned over the spatial extent of the layer by locally varying the void topology, i.e., during printing.

An electroactive device may include a plurality of stacked layers. For example, an electroactive device may include multiple nanovoided polymer layers each arranged between a pair of electrodes. For example, an electroactive device may include a stack of from two electroactive layers and corresponding electrodes to thousands of electroactive layers (e.g., approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 electroactive layers, including ranges between any of the foregoing values). A large number of layers may be used to achieve a high displacement output, where the overall device displacement may be expressed as the sum of the displacement of each layer.

In some embodiments, an electrode may be shared between layers; for example, a device may have alternating electrodes and nanovoided polymer layers located between neighboring pairs of electrodes. Various stacked configurations can be constructed in different geometries that alter the shape, alignment, and spacing between layers. Such complex arrangements can enable compression, extension, twisting, and/or bending when operating the electroactive device.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-11, a detailed description of methods and systems related to the manufacture and implementation of gas-impregnated nanovoided polymers. The discussion associated with FIGS. 1-5 includes a description of actuator and passive optic architectures including nanovoided polymer layers having a fill gas disposed within the nanovoids according to various embodiments. The discussion associated with FIGS. 6-11 relates to exemplary virtual reality and augmented reality devices that may include an optical element including a gas soluble nanovoided polymer.

The application of a voltage between the electrodes can cause compression of an intervening nanovoided polymer layer in the direction of the applied electric field and an associated expansion or contraction of the nanovoided polymer layer in one or more transverse dimensions. Such actuation can be used to manipulate the topology of nanovoids within the polymer matrix and, in turn, the optical and mechanical properties of the actuator.

A sealed actuator including a nanovoided polymer layer having gas-filled voids is shown schematically in FIG. 1. Sealed actuator 100 includes a pair of nanovoided polymer layers, with each layer being driven by a pair of electrodes. FIG. 1A shows the actuator 100 in an unactuated state having a first nanovoided polymer layer 110, a second nanovoided polymer layer 120, a primary electrode 131 disposed between the first and second nanovoided polymer layers 110, 120, a secondary electrode 132 disposed over a lower surface of the first nanovoided polymer layer 110, and a tertiary electrode 133 disposed over an upper surface of the second nanovoided polymer layer 120.

In some embodiments, the primary electrode 131 may overlap (e.g., overlap in a horizontal direction) at least a portion of the secondary electrode 132, and the tertiary electrode 133 may overlap at least a portion of the primary electrode 131. The first nanovoided polymer layer 110 may include a first elastomeric material disposed between and abutting the primary electrode 131 and the secondary electrode 132. The second electroactive polymer layer 120 may include a second elastomeric material disposed between and abutting the primary electrode 131 and the tertiary electrode 133. Each of the first and second nanovoided polymer layers 110, 120 includes a respective polymer matrix 112, 122 having a plurality of nanovoids 114, 124 dispersed throughout the matrix. The nanovoids 114, 124 may be at least partially filled, e.g., entirely filled, with a fill gas 116, 126.

In the illustrated embodiment, the primary electrode 131 may be connected to a first contact layer 141, whereas the secondary electrode 132 and the tertiary electrode 133 may each be connected to a second contact layer 142. A hermetic sealing layer 150 may envelope actuator 100, including the gas-impregnated first and second nanovoided polymer layers 110, 120 and the electrodes (e.g., primary electrode 131, secondary electrode 132, tertiary electrode 133, first contact layer 141, and second contact layer 142). A first common electrode 141a electrically connected to the first contact layer 141 and a second common electrode 142a electrically connected to the second contact layer 142 may each extend through the sealing layer 150 to provide electrical connections to the primary, secondary and tertiary electrodes 131, 132, 133.

In some embodiments, the contact layers (e.g., the first contact layer 141 and the second contact layer 142) may be structured in a number of different ways than shown. For example, the contact layers may form a sloped shape, or may be a more complex shape (e.g., patterned or freeform). In some embodiments, the contact layers may be shaped to allow compression and expansion of the actuator 100 during operation.

Referring to FIG. 1B, according to some embodiments, the application of a voltage across the nanovoided polymer layers 110, 120 may cause compression of the layers and an attendant lateral expansion. In the actuated state of FIG. 1B, the fill gas expelled from deformed nanovoids 114b, 124b may be absorbed by the polymer matrix 112, 122.

Figure 2:
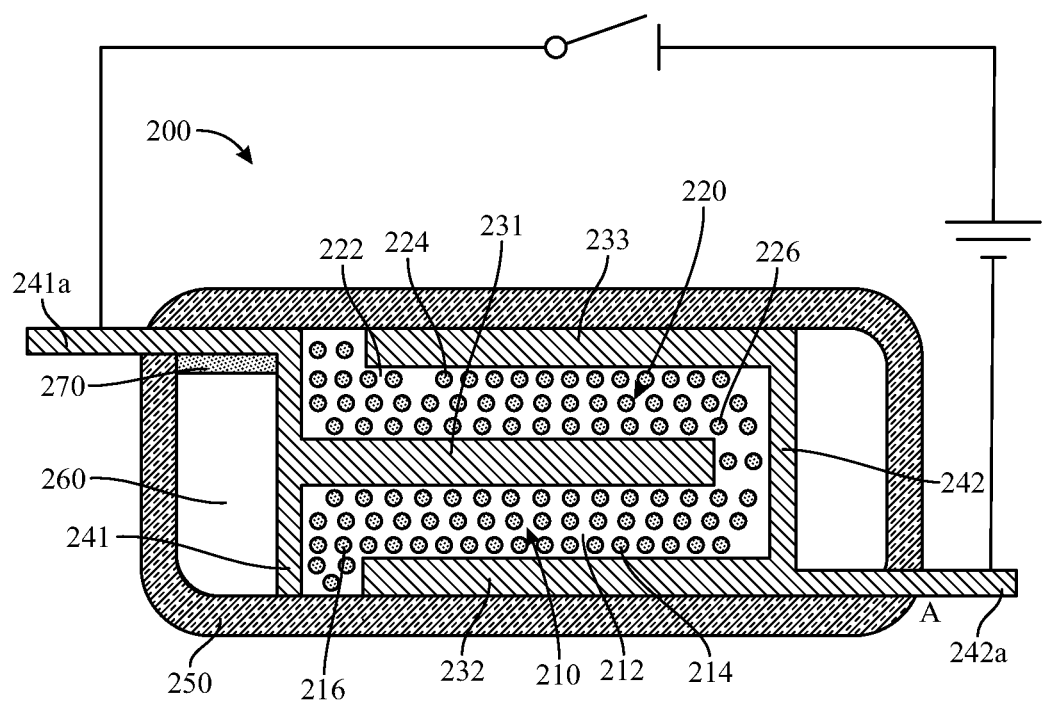
FIG. 2 is a schematic illustration of a gas-impregnated nanovoided polymer actuator according to further embodiments.
Figure 2:
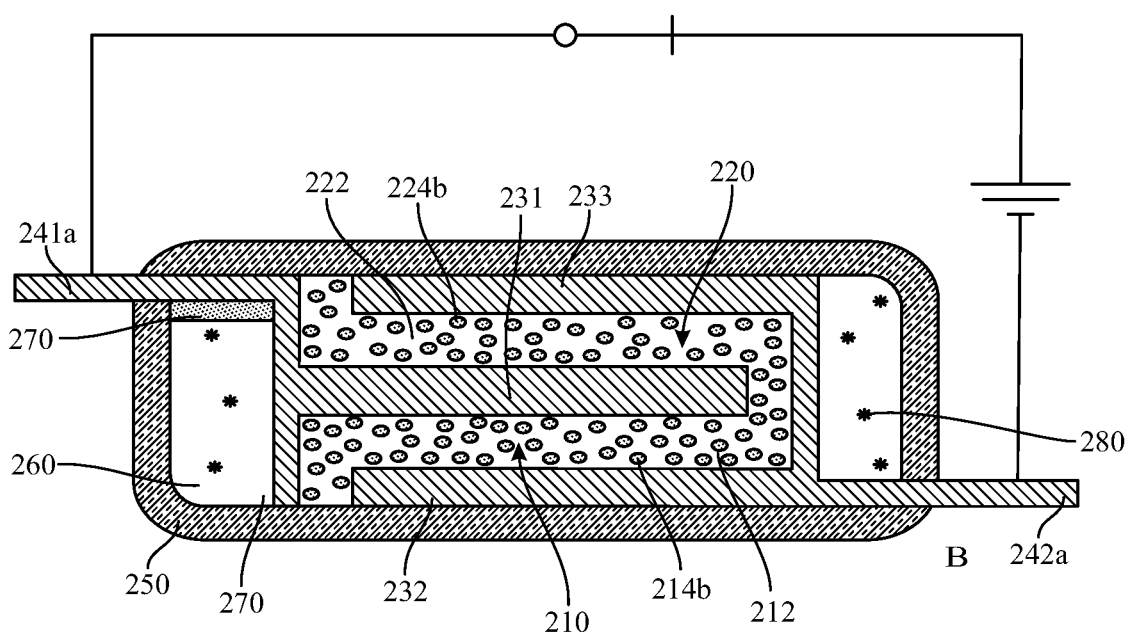

According to further embodiments, a sealed actuator including a nanovoided polymer layer having gas-filled voids is shown in FIG. 2. Sealed actuator 200 includes a pair of nanovoided polymer layers, with each layer being driven by a pair of electrodes. FIG. 2A shows the actuator 200 in an unactuated state having a first nanovoided polymer layer 210, a second nanovoided polymer layer 220, a primary electrode 231 disposed between the first and second nanovoided polymer layers 210, 220, a secondary electrode 232 disposed over a lower surface of the first nanovoided polymer layer 210, and a tertiary electrode 233 disposed over an upper surface of the second nanovoided polymer layer 220.

The primary electrode 231 may overlap (e.g., overlap in a horizontal direction) at least a portion of the secondary electrode 232, and the tertiary electrode 233 may overlap at least a portion of the primary electrode 231. The first nanovoided polymer layer 210 may include a first elastomeric material disposed between and abutting the primary electrode 231 and the secondary electrode 232. The second electroactive polymer layer 220 may include a second elastomeric material disposed between and abutting the primary electrode 231 and the tertiary electrode 233. Each of the first and second nanovoided polymer layers 210, 220 includes a respective polymer matrix 212, 222 having a plurality of nanovoids 214, 224 dispersed throughout the respective matrix. The nanovoids 214, 224 may be at least partially filled, e.g., entirely filled, with a fill gas 216, 226.

As illustrated, the primary electrode 231 may be connected to a first contact layer 241, whereas the secondary electrode 232 and the tertiary electrode 233 may each be connected to a second contact layer 242. A hermetic sealing layer 250 may envelope actuator 200, including the gas-impregnated first and second nanovoided polymer layers 210, 220 and the electrodes (e.g., primary electrode 231, secondary electrode 232, tertiary electrode 233, first contact layer 241, and second contact layer 242). A first common electrode 241a electrically connected to the first contact layer 241 and a second common electrode 242a electrically connected to the second contact layer 242 may each extend through the sealing layer 250 to provide electrical connections to the primary, secondary, and tertiary electrodes 231, 232, 233.

According to certain embodiments, the sealing layer 250 may be formed directly over portions of the nanovoided polymer layers 210, 220, directly over exposed portions of the electrodes, e.g., lower surface of secondary electrode 232 and upper surface of tertiary electrode 233, and/or over exposed surfaces of the first and second contact layers 241, 242. In certain embodiments, the sealing layer 250 may be spaced away from portions the nanovoided polymer layer(s) and/or one or more of the electrodes to form a gap or gas reservoir 260 proximate to the actuator 200.

As shown in FIG. 2A and FIG. 2B, the gas reservoir 260 may include a moisture getter 270, such as a layer of a suitable getter material disposed over an inner surface of the gas reservoir 260. A layer of getter material 270 may be formed over a surface of a contact layer, for example, prior to forming the sealing layer 250. Example moisture getter materials include microporous polyimides and microporous polyamides, which may absorb moisture contained within the gas reservoir 260.

As in the embodiment of FIG. 1, the contact layers (e.g., the first contact layer 241 and the second contact layer 242) may be structured in a number of different ways. For example, the contact layers may form a sloped shape, or may be a more complex shape (e.g., patterned or freeform). In some embodiments, the contact layers may be shaped to allow compression and expansion of the actuator 200 during operation.

Referring to FIG. 2B, according to some embodiments, the application of a voltage across the nanovoided polymer layers 210, 220 may cause compression of the polymer layers and an attendant lateral expansion. In the actuated state of FIG. 2B, the fill gas expelled from deformed nanovoids 214b, 224b may be absorbed by the polymer matrix 212, 222 and/or desorbed from the polymer matrix 212, 222 into gas reservoir 260 as gas molecules 280.

Figure 3:
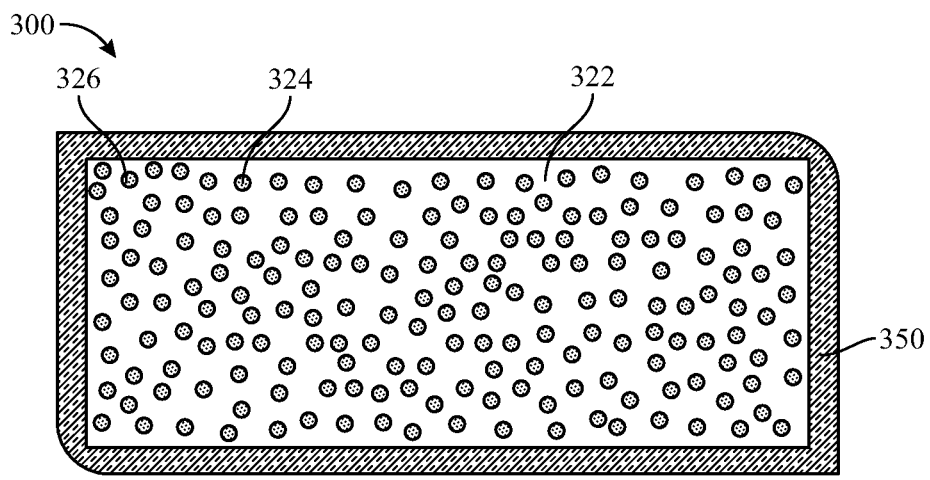
FIG. 3 is a schematic illustration of a gas-impregnated nanovoided polymer according to some embodiments.

According to further embodiments, a gas-impregnated nanovoided polymer layer is shown schematically in FIG. 3. The sealed nanovoided polymer layer 300 includes polymer matrix 322 having a plurality of nanovoids 324 dispersed throughout the matrix 322. The nanovoids 324 may be at least partially filled, e.g., entirely filled, with a fill gas 326. A hermetic sealing layer 350 may envelope the nanovoided polymer layer. For instance, hermetic sealing layer 350 may be disposed over, e.g., directly over, gas-impregnated polymer matrix 322.

Figure 4:
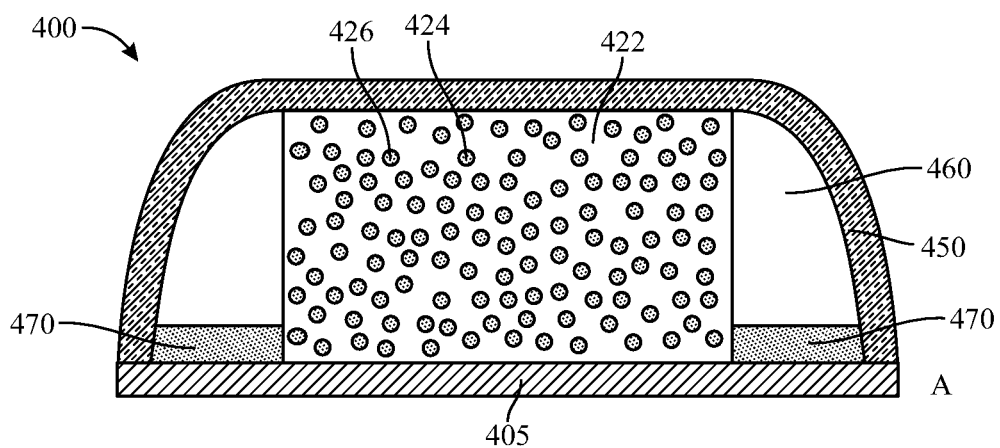
FIG. 4 is a schematic illustration of a gas-impregnated nanovoided polymer actuator according to further embodiments.
Figure 4:
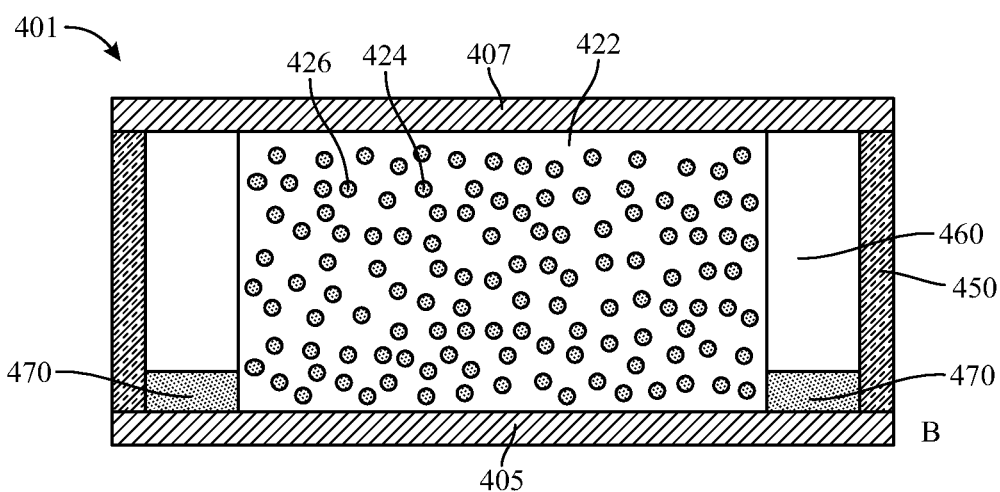

According to still further embodiments, a sealed nanovoided polymer layer having gas-filled voids is shown in FIG. 4. Referring initially to FIG. 4A, the sealed nanovoided polymer layer 400 may be formed over a substrate 405 and may include a polymer matrix 422 having a plurality of nanovoids 424 dispersed throughout the matrix 422. The nanovoids 424 may be at least partially filled, e.g., entirely filled, with a fill gas 426. A hermetic sealing layer 450 may be formed over the polymer matrix 422. According to certain embodiments, the sealing layer 450 may be spaced away from portions of the polymer matrix 422 to form a gap or gas reservoir 460 proximate to the nanovoided polymer layer.

As shown in FIG. 4A, the gas reservoir 460 may include a moisture getter 470, such as a layer of a suitable getter material disposed over an inner surface of the gas reservoir 460. For example, a layer of getter material 470 may be formed over an exposed surface of the substrate 405 with gas reservoir 460.

Referring to FIG. 4B, a sealed nanovoided polymer layer 401 may include a polymer matrix 422 having a plurality of nanovoids 424 dispersed throughout the matrix 422. The nanovoids 424 may be at least partially filled, e.g., entirely filled, with a fill gas 426. Sealed nanovoided polymer layer 401 may be disposed between substrate 405 and a capping layer 407. A hermetic sealing layer 450 may be formed peripheral to the polymer matrix 422 and, in certain embodiments, may be spaced away from the polymer matrix 422 to form a gas reservoir 460. A layer of getter material 470 may be formed over an exposed surface of the substrate 405 with gas reservoir 460. Substrate 405 and capping layer 407 may include a glass or polymer, such as a transparent glass or polymer, for example. As will be appreciated, the un-electroded nanovoided polymer layers of FIG. 3 and FIG. 4 may be incorporated into a variety of passive optics, for example.

Figure 5:
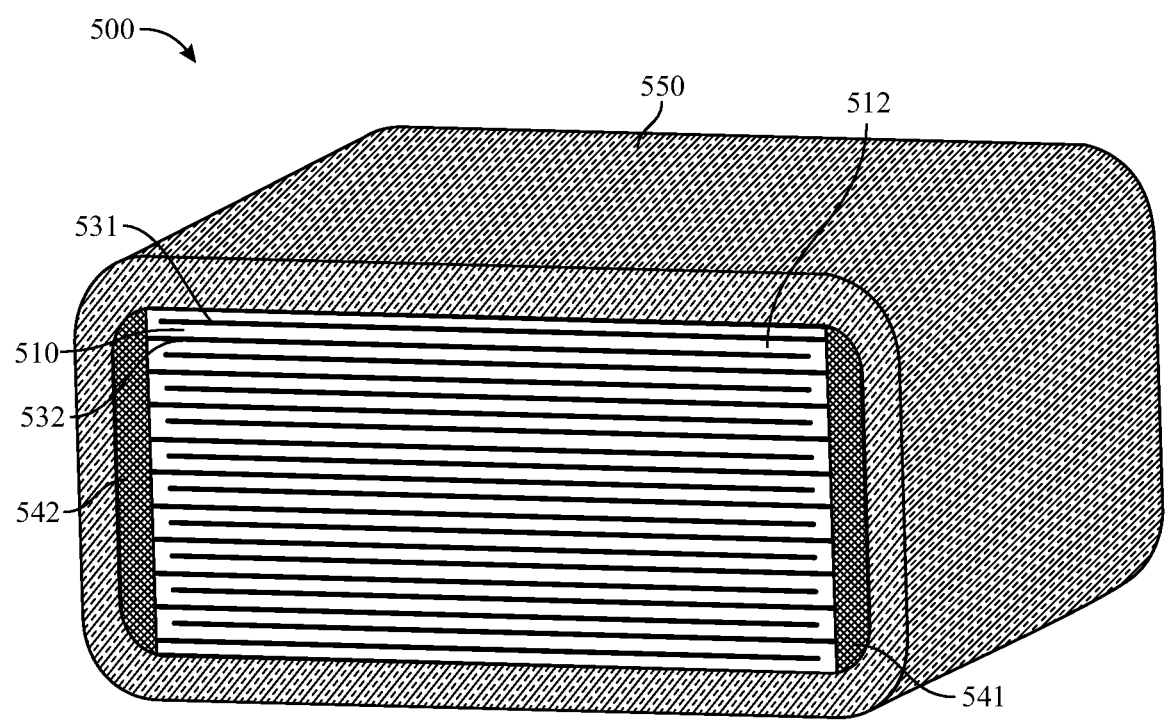
FIG. 5 show a multi-layer gas-impregnated nanovoided polymer actuator according to various embodiments.

According to further embodiments, a sealed multilayer actuator including a plurality of nanovoided polymer layers having gas-filled voids and disposed between alternating electrodes is shown schematically in FIG. 5. Sealed multilayer actuator 500 may include a plurality of interdigitated electrodes, including a primary electrode 531, a secondary electrode 532 spaced away from the primary electrode 531, and an electroactive layer 510 disposed between the primary electrode 531 and the secondary electrode 532. The electroactive layer 510 may include a polymer matrix 512 having a plurality of nanovoids (not shown) dispersed throughout the matrix 512. The nanovoids may be at least partially filled, e.g., entirely filled, with a fill gas. The actuator stack 500 may additionally include a primary contact layer 541 overlying and in electrical contact with a sidewall of the primary electrode 531, and a secondary contact layer 542 overlying and in electrical contact with a sidewall of the secondary electrode 534. A hermetic sealing layer 550 may envelope multilayer actuator 500.

Example Embodiments

Example 1: An actuator includes a primary electrode, a secondary electrode overlapping at least a portion of the primary electrode, a nanovoided polymer layer disposed between and abutting the primary electrode and the secondary electrode, the nanovoided polymer layer including a plurality of nanovoids dispersed throughout a polymer matrix, and a sealing layer at least partially encapsulating the nanovoided polymer layer, wherein the nanovoids include a fill gas.

Example 2: The actuator of Example 1, wherein the polymer matrix includes an elastomer.

Example 3: The actuator of any of Examples 1 and 2, wherein the sealing layer is configured to retain the fill gas within the actuator.

Example 4: The actuator of any of Examples 1-3, wherein the sealing layer is configured to inhibit the ingress of contaminants into the actuator.

Example 5: The actuator of any of Examples 1-4, wherein the sealing layer includes an elastomer.

Example 6: The actuator of any of Examples 1-5, wherein the sealing layer includes at least one of poly(vinyl acetate), poly(vinyl alcohol), poly(ethylene vinyl alcohol), polyurethane, polyvinylidene fluoride, poly-chloro-trifluoroethylene, polyhedral oligomeric silsesquioxane, chloro-fluoropolymers, and aliphatic or semi-aromatic polyamides.

Example 7: The actuator of any of Examples 1-6, wherein a difference in Hildebrand solubility parameter between the fill gas and the sealing layer is at least 5 $MPa^{1/2}$.

Example 8: The actuator of any of Examples 1-7, wherein a mechanical stiffness of the sealing layer is less than a mechanical stiffness of the nanovoided polymer layer.

Example 9: The actuator of any of Examples 1-8, wherein the fill gas includes at least one of Ar, $N_2$, Kr, Xe, $O_2$, $SF_6$, $CHF_3$, $CF_4$, $C_2F_6$, $C_3F_8$, and air.

Example 10: The actuator of any of Examples 1-9, wherein a difference in Hildebrand solubility parameter between the nanovoided polymer and the fill gas is less than 2 $MPa^{1/2}$.

Example 11: The actuator of any of Examples 1-10, further including a gas reservoir at least partially encapsulated by the sealing layer.

Example 12: The actuator of Example 11, further including a layer of getter material located within the gas reservoir.

Example 13: The actuator of Example 11 or 12, wherein at least a portion of the polymer matrix is directly exposed to the gas reservoir.

Example 14: An actuator includes: a primary electrode, a secondary electrode overlapping at least a portion of the primary electrode, a nanovoided polymer layer disposed between and abutting the primary electrode and the secondary electrode, a fill gas located within nanovoids of the nanovoided polymer layer, a hermetic sealing layer at least partially encapsulating the nanovoided polymer layer, and a gas reservoir located proximate to the nanovoided polymer layer.

Example 15: The actuator of Example 14, wherein the sealing layer includes an elastomer.

Example 16: The actuator of Example 14 or 15, wherein the sealing layer includes at least one of poly(vinyl acetate), poly(vinyl alcohol), poly(ethylene vinyl alcohol), polyurethane, polyvinylidene fluoride, poly-chloro-trifluoroethylene, polyhedral oligomeric silsesquioxane, chloro-fluoropolymers, and aliphatic or semi-aromatic polyamides Example 17: The actuator of any of Examples 14-16, wherein the nanovoided polymer layer and the gas reservoir are encapsulated by the sealing layer.

Example 18: A method includes forming an actuator includes (i) a primary electrode, a secondary electrode overlapping at least a portion of the primary electrode, and a nanovoided polymer layer disposed between and abutting the primary electrode and the secondary electrode, (ii) introducing a fill gas into nanovoids of the nanovoided polymer layer, and (iii) forming a sealing layer over the nanovoided polymer layer.

Example 19: The method of Example 18, where introducing the fill gas into the nanovoids includes placing the actuator within a vacuum processing chamber prior to forming the sealing layer, evacuating the vacuum processing chamber, and introducing the fill gas into the vacuum processing chamber.

Example 20: The method of Example 18 or 19, where the sealing layer is formed within the vacuum processing chamber after introducing the fill gas into the vacuum processing chamber.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 600 in FIG. 6. Other artificial-reality systems may include an NED that also provides visibility into the real world (e.g., augmented-reality system 700 in FIG. 7) or that visually immerses a user in an artificial reality (e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
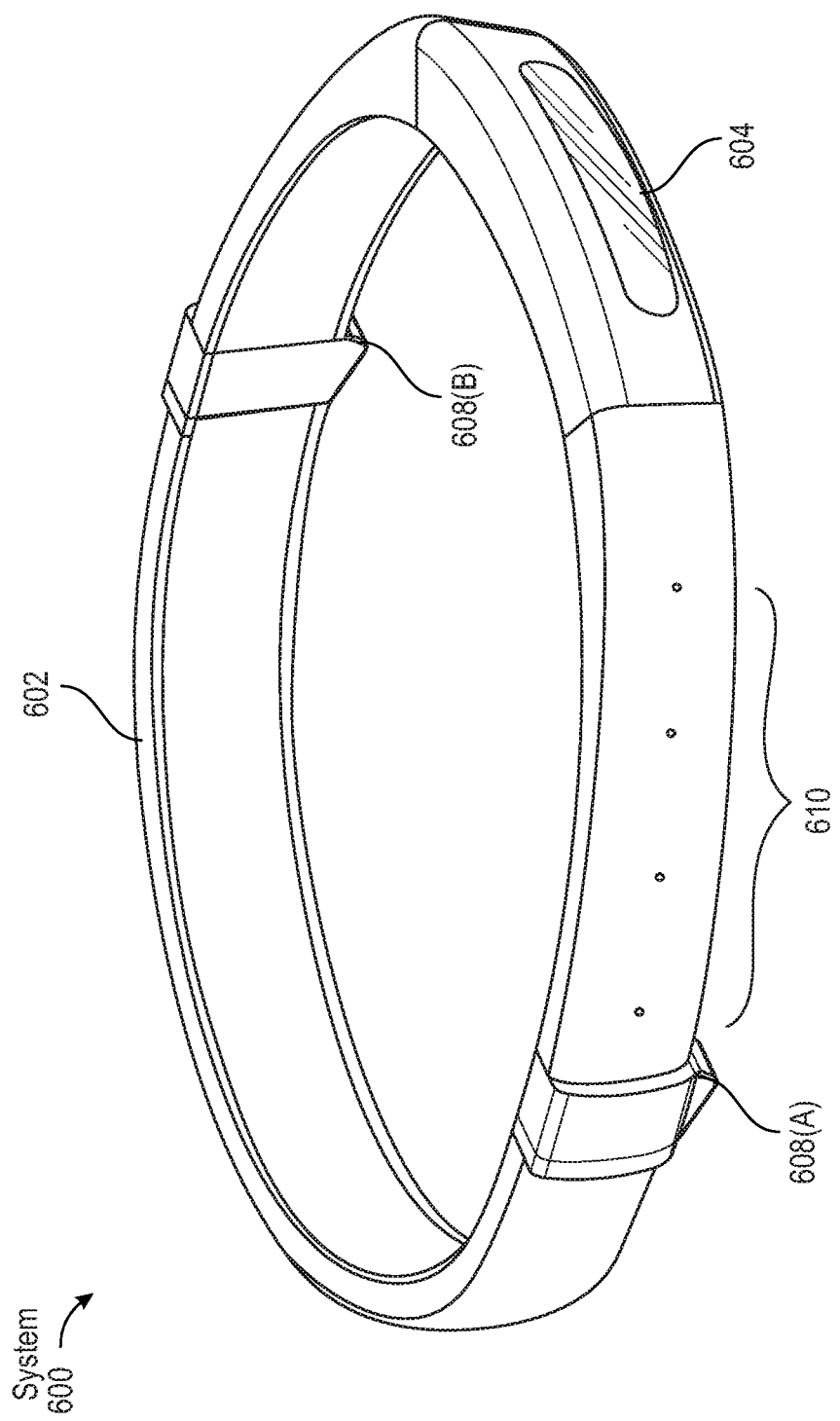
FIG. 6 is an illustration of an exemplary artificial-reality headband that may be used in connection with embodiments of this disclosure.

Turning to FIG. 6, augmented-reality system 600 generally represents a wearable device dimensioned to fit about a body part (e.g., a head) of a user. As shown in FIG. 6, system 600 may include a frame 602 and a camera assembly 604 that is coupled to frame 602 and configured to gather information about a local environment by observing the local environment. Augmented-reality system 600 may also include one or more audio devices, such as output audio transducers 608(A) and 608(B) and input audio transducers 610. Output audio transducers 608(A) and 608(B) may provide audio feedback and/or content to a user, and input audio transducers 610 may capture audio in a user's environment.

As shown, augmented-reality system 600 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 600 may not include an NED, augmented-reality system 600 may include other types of screens or visual feedback devices (e.g., a display screen integrated into a side of frame 602).

Figure 7:
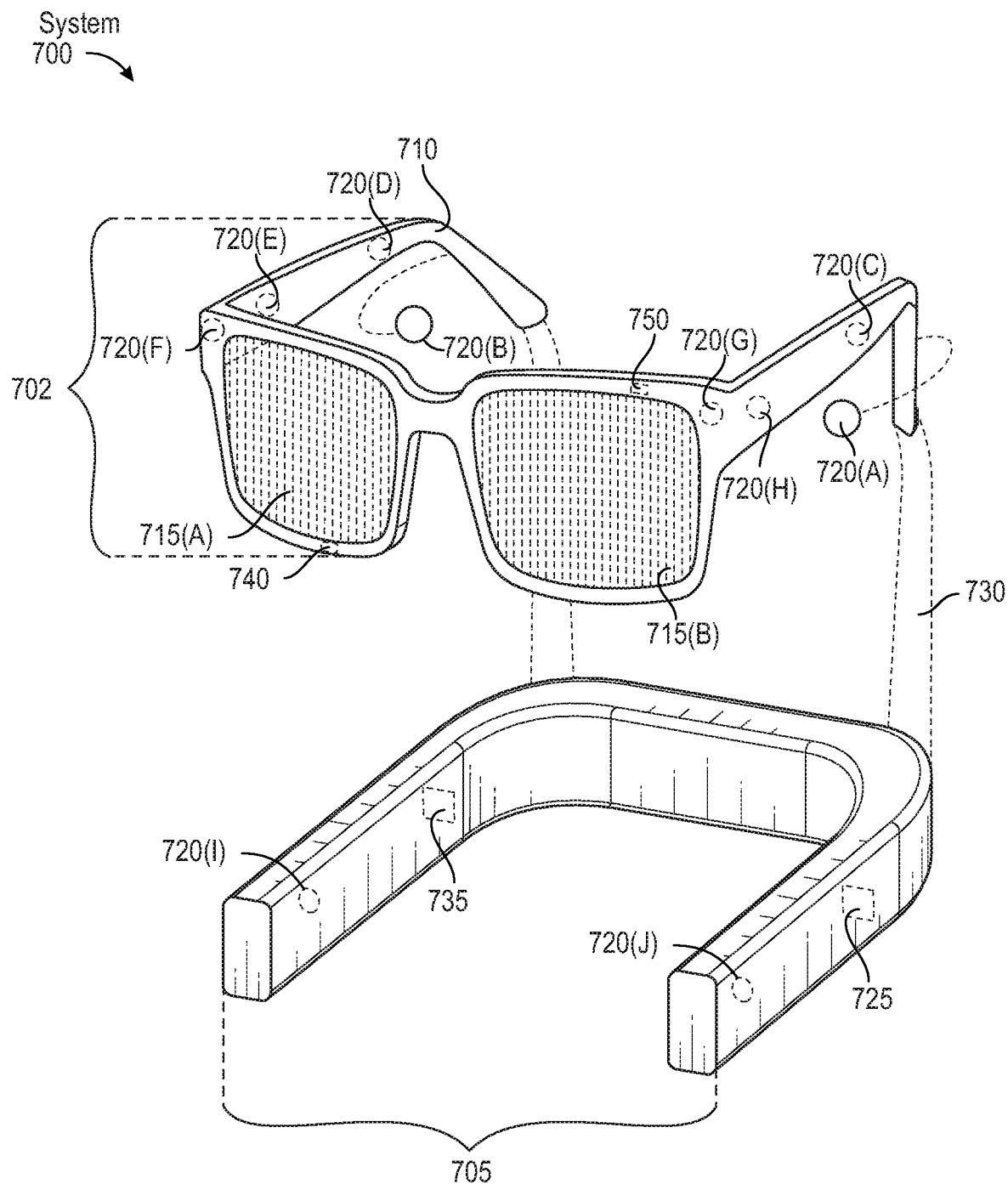
FIG. 7 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent a position sensor, an inertial measurement unit (IMU), a depth camera assembly, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof. Augmented-reality system 700 may also include a microphone array with a plurality of acoustic transducers 720(A)-720(J), referred to collectively as acoustic transducers 720. Acoustic transducers 720 may be transducers that detect air pressure variations induced by sound waves. Each acoustic transducer 720 may be configured to detect sound and convert the detected sound into an electronic format (e.g., an analog or digital format). The microphone array in FIG. 2 may include, for example, ten acoustic transducers: 720(A) and 720(B), which may be designed to be placed inside a corresponding ear of the user, acoustic transducers 720(C), 720(D), 720(E), 720(F), 720 (G), and 720(H), which may be positioned at various locations on frame 710, and/or acoustic transducers 720(1) and 720(J), which may be positioned on a corresponding neckband 705.

In some embodiments, one or more of acoustic transducers 720(A)-(F) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments, acoustic transducers 720(A) and 720(B) may be connected to augmented-reality system 700 via a wireless connection (e.g., a Bluetooth connection). In still other embodiments, acoustic transducers 720(A) and 720(B) may not be used at all in conjunction with augmented-reality system 700.

Acoustic transducers 720 on frame 710 may be positioned along the length of the temples, across the bridge, above or below display devices 715(A) and 715(B), or some combination thereof. Acoustic transducers 720 may be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers and other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(1) and 720(J)) that are part of the microphone array (or potentially form their own microphone subarray). Neckband 705 may also include a controller 725 and a power source 735.

Acoustic transducers 720(1) and 720(J) of neckband 705 may be configured to detect sound and convert the detected sound into an electronic format (analog or digital). In the embodiment of FIG. 7, acoustic transducers 720(1) and 720(J) may be positioned on neckband 705, thereby increasing the distance between the neckband acoustic transducers 720(1) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720(D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 600, augmented-reality system 700, and/or virtual-reality system 800 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 6 and 8, output audio transducers 608(A), 608(B), 806(A), and 806(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 610 may include condenser microphones, dynamic microphones, ribbon microphones, and/or any other type or form of input transducer. In some embodiments, a single transducer may be used for both audio input and audio output.

Figure 8:
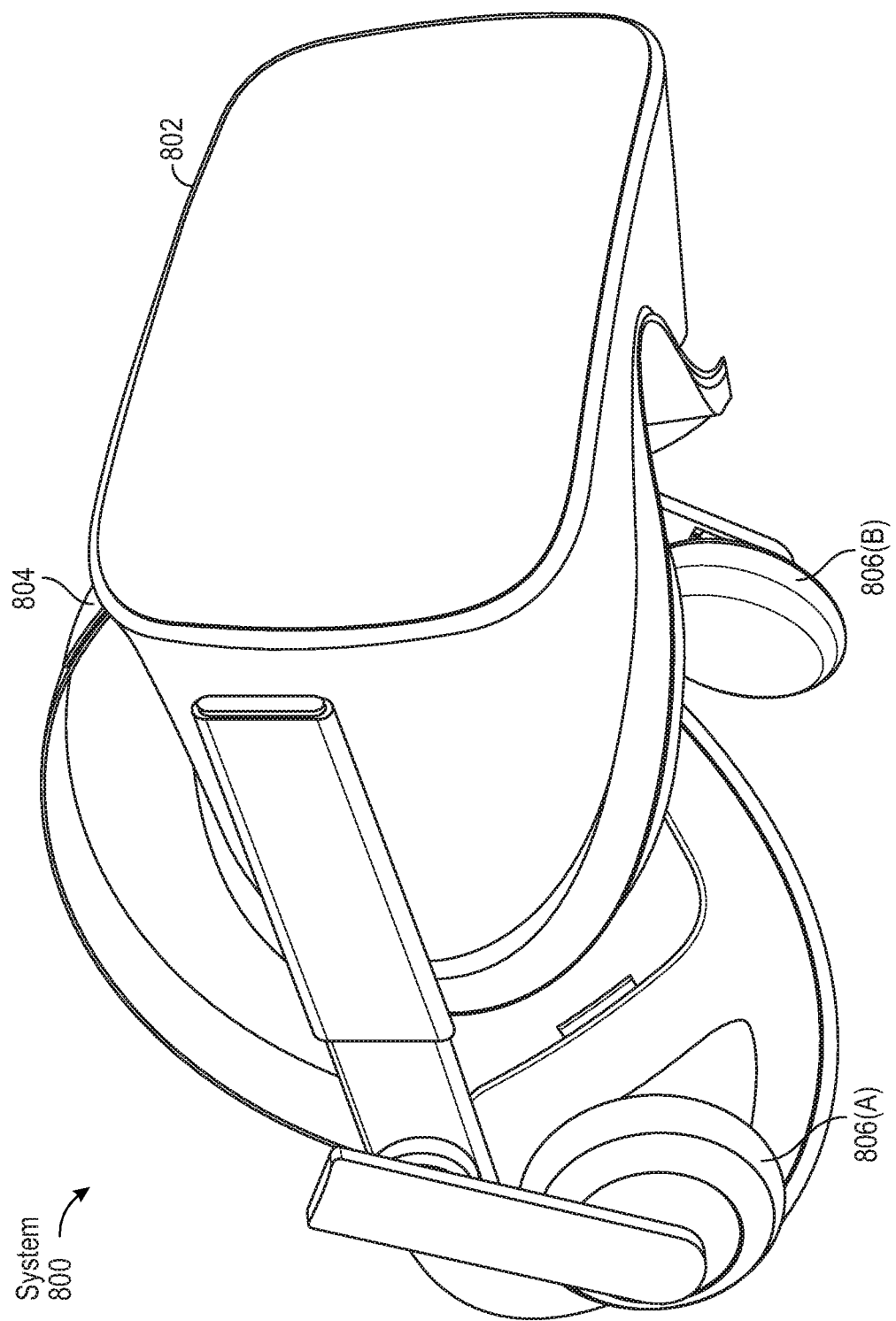
FIG. 8 is an illustration of an exemplary virtual-reality headset that may be used in connection with embodiments of this disclosure.

While not shown in FIGS. 6-8, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 600, 700, and 800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 9:
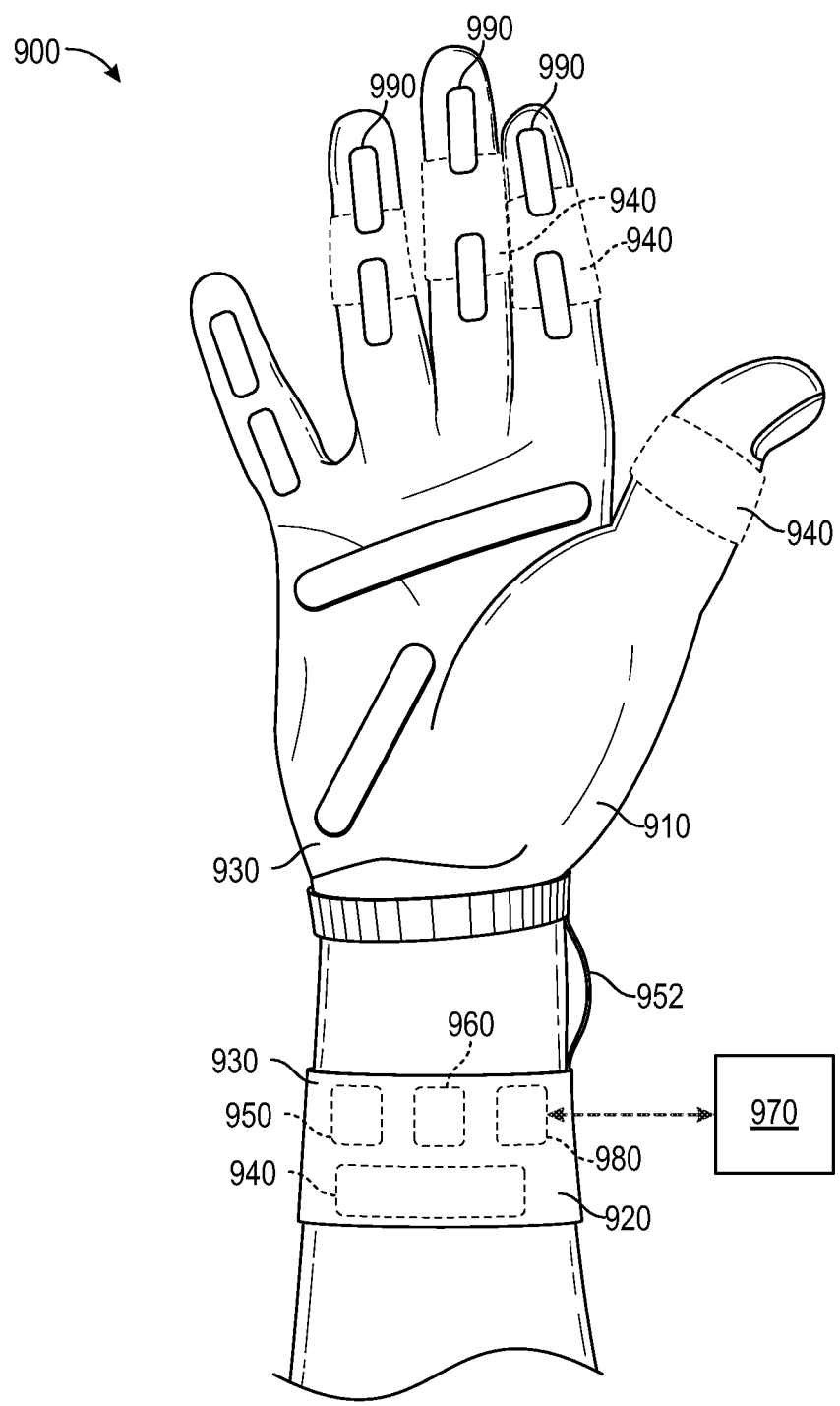
FIG. 9 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 9 illustrates a vibrotactile system 900 in the form of a wearable glove (haptic device 910) and wristband (haptic device 920). Haptic device 910 and haptic device 920 are shown as examples of wearable devices that include a flexible, wearable textile material 930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 940 may be positioned at least partially within one or more corresponding pockets formed in textile material 930 of vibrotactile system 900. Vibrotactile devices 940 may be positioned in locations to provide a vibrating sensation (e.g., haptic feedback) to a user of vibrotactile system 900. For example, vibrotactile devices 940 may be positioned to be against the user's finger(s), thumb, or wrist, as shown in FIG. 9. Vibrotactile devices 940 may, in some examples, be sufficiently flexible to conform to or bend with the user's corresponding body part(s).

A power source 950 (e.g., a battery) for applying a voltage to the vibrotactile devices 940 for activation thereof may be electrically coupled to vibrotactile devices 940, such as via conductive wiring 952. In some examples, each of vibrotactile devices 940 may be independently electrically coupled to power source 950 for individual activation. In some embodiments, a processor 960 may be operatively coupled to power source 950 and configured (e.g., programmed) to control activation of vibrotactile devices 940.

Vibrotactile system 900 may be implemented in a variety of ways. In some examples, vibrotactile system 900 may be a standalone system with integral subsystems and components for operation independent of other devices and systems. As another example, vibrotactile system 900 may be configured for interaction with another device or system 970. For example, vibrotactile system 900 may, in some examples, include a communications interface 980 for receiving and/or sending signals to the other device or system 970. The other device or system 970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 980 may enable communications between vibrotactile system 900 and the other device or system 970 via a wireless (e.g., Wi-Fi, Bluetooth, cellular, radio, etc.) link or a wired link. If present, communications interface 980 may be in communication with processor 960, such as to provide a signal to processor 960 to activate or deactivate one or more of the vibrotactile devices 940.

Vibrotactile system 900 may optionally include other subsystems and components, such as touch-sensitive pads 990, pressure sensors, motion sensors, position sensors, lighting elements, and/or user interface elements (e.g., an on/off button, a vibration control element, etc.). During use, vibrotactile devices 940 may be configured to be activated for a variety of different reasons, such as in response to the user's interaction with user interface elements, a signal from the motion or position sensors, a signal from the touch-sensitive pads 990, a signal from the pressure sensors, a signal from the other device or system 970, etc.

Although power source 950, processor 960, and communications interface 980 are illustrated in FIG. 9 as being positioned in haptic device 920, the present disclosure is not so limited. For example, one or more of power source 950, processor 960, or communications interface 980 may be positioned within haptic device 910 or within another wearable textile.

Figure 10:
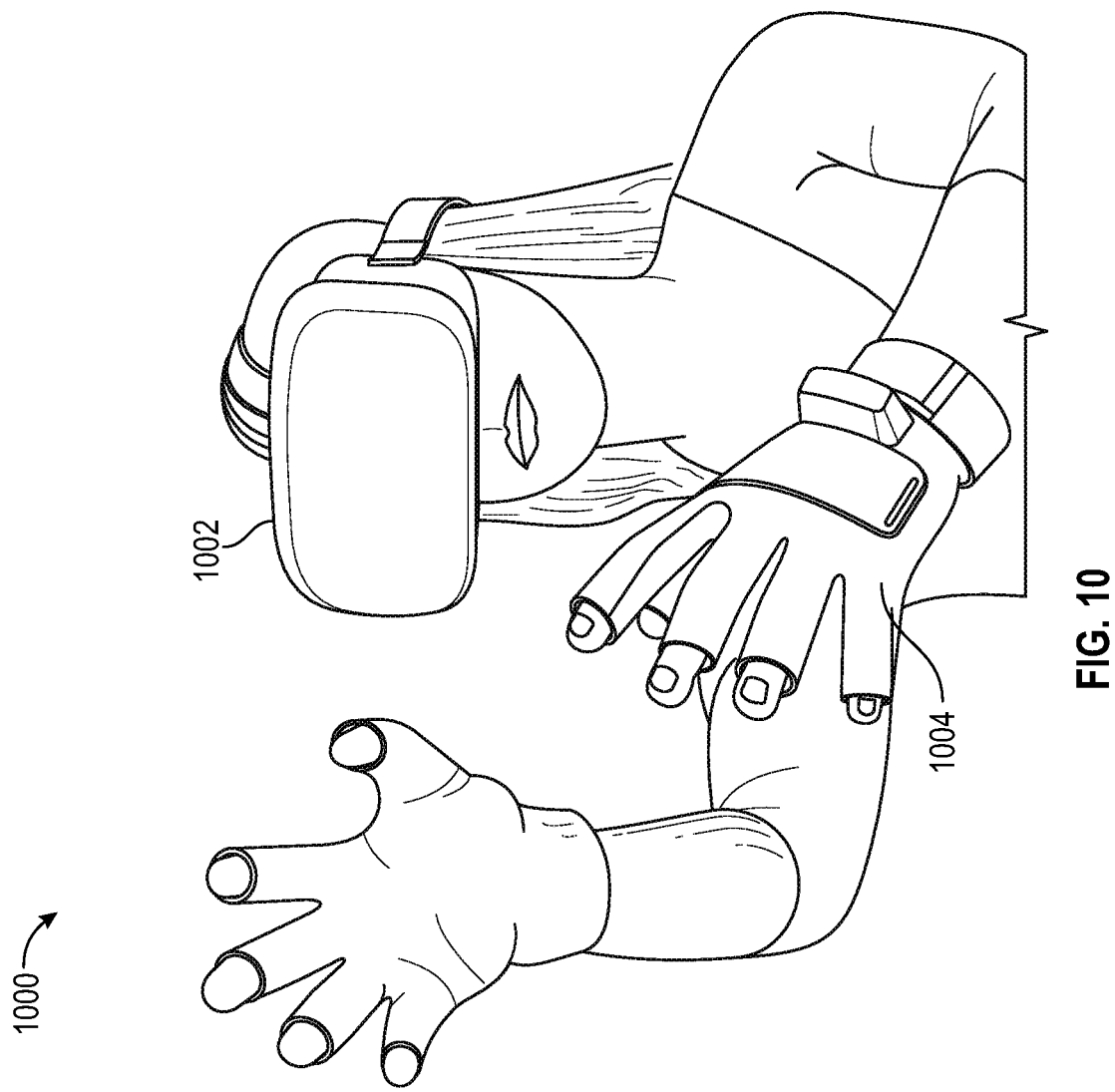
FIG. 10 is an illustration of an exemplary virtual-reality environment according to embodiments of this disclosure.

Haptic wearables, such as those shown in and described in connection with FIG. 9, may be implemented in a variety of types of artificial-reality systems and environments. FIG. 10 shows an example artificial-reality environment 1000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1002 generally represents any type or form of virtual-reality system, such as virtual-reality system 800 in FIG. 8. Haptic device 1004 generally represents any type or form of wearable device, worn by a use of an artificial-reality system, that provides haptic feedback to the user to give the user the perception that he or she is physically engaging with a virtual object. In some embodiments, haptic device 1004 may provide haptic feedback by applying vibration, motion, and/or force to the user. For example, haptic device 1004 may limit or augment a user's movement. To give a specific example, haptic device 1004 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1004 to send action requests to a console. Examples of action requests include, without limitation, requests to start an application and/or end the application and/or requests to perform a particular action within the application.

Figure 11:
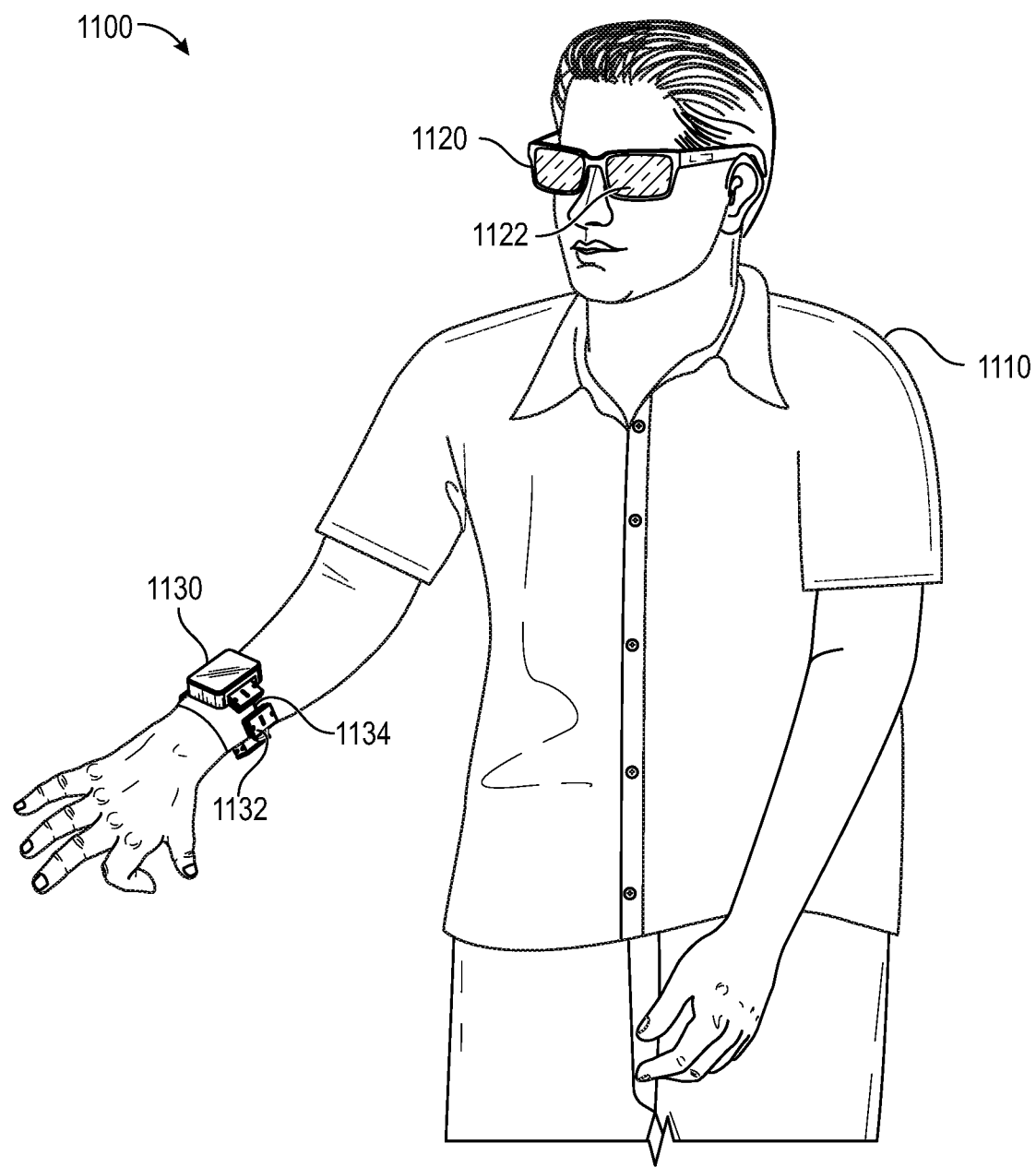
FIG. 11 is an illustration of an exemplary augmented-reality environment according to embodiments of this disclosure.

While haptic interfaces may be used with virtual-reality systems, as shown in FIG. 10, haptic interfaces may also be used with augmented-reality systems, as shown in FIG. 11.

FIG. 11 is a perspective view a user 1110 interacting with an augmented-reality system 1100. In this example, user 1110 may wear a pair of augmented-reality glasses 1120 that have one or more displays 1122 and that are paired with a haptic device 1130. Haptic device 1130 may be a wristband that includes a plurality of band elements 1132 and a tensioning mechanism 1134 that connects band elements 1132 to one another.

One or more of band elements 1132 may include any type or form of actuator suitable for providing haptic feedback. For example, one or more of band elements 1132 may be configured to provide one or more of various types of cutaneous feedback, including vibration, force, traction, texture, and/or temperature. To provide such feedback, band elements 1132 may include one or more of various types of actuators. In some embodiments, an actuator may include a layer of nanovoided polymer sandwiched between conductive electrodes. In one example, each of band elements 1132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 910, 920, 1004, and 1130 may include any suitable number and/or type of haptic transducer, sensor, and/or feedback mechanism. For example, haptic devices 910, 920, 1004, and 1130 may include one or more mechanical transducers, piezoelectric transducers, and/or fluidic transducers. Haptic devices 910, 920, 1004, and 1130 may also include various combinations of different types and forms of transducers that work together or independently to enhance a user's artificial-reality experience. In one example, each of band elements 1132 of haptic device 1130 may include a vibrotactor (e.g., a vibrotactile actuator) configured to vibrate in unison or independently to provide one or more of various types of haptic sensations to a user.

As discussed throughout the instant disclosure, the disclosed devices, systems, and methods may provide one or more advantages over conventional devices, systems, and methods. For example, in contrast to prior devices, the electroactive devices presented herein may include electroactive elements that achieve substantially uniform strain in the presence of an electrostatic field produced by a potential difference between paired electrodes, permitting the electroactive devices to achieve, for example, improvements in both energy density and specific power density. Such uniform strain may reduce or eliminate unwanted deformations in the electroactive elements and may result in greater overall deformation, such as compression, of the electroactive elements, providing a greater degree of movement of surface regions of the electroactive elements while requiring a lower amount of energy to provide such deformation. The electroactive elements may include polymer materials having nanovoided regions that allow for additional compression in the presence of a voltage gradient in comparison to non-voided materials. Additionally, an electroactive device may be formed in a stacked structure having a plurality of gas-impregnated electroactive elements that are layered with multiple electrodes, enabling the plurality of electroactive elements to be actuated in conjunction with each other in a single device that may undergo a more substantial degree of deformation (e.g., compression and/or expansion) in comparison to an electroactive device having a single electroactive element or layer.

Electroactive devices described and shown herein may be utilized in any suitable technologies, without limitation. For example, such electroactive devices may be utilized as mechanical actuators to actuate movement of adjacent components. In at least one embodiment, the disclosed electroactive devices may be incorporated into optical systems such as adjustable lenses (e.g., fluid-filled lenses) to actuate movement of one or more optical layers. Such actuation may, for example, allow for selected movement of lens layers of an adjustable lens, resulting in deformation of the lens layers to adjust optical characteristics (e.g., focal point, spherical correction, cylindrical correction, axial correction, etc.) of the adjustable lens. In some embodiments, electroactive devices as disclosed herein may be utilized as actuators in micromechanical apparatuses, such as microelectromechanical devices. Additionally or alternatively, electroactive devices may be used for converting mechanical energy to electrical energy for use in energy harvesting systems and/or sensor apparatuses.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An actuator comprising:
   a primary electrode;
   a secondary electrode overlapping at least a portion of the primary electrode;
   a nanovoided polymer layer disposed between and abutting the primary electrode and the secondary electrode, the nanovoided polymer layer comprising a plurality of nanovoids dispersed throughout a polymer matrix; and
   a sealing layer at least partially encapsulating the nanovoided polymer layer, wherein the nanovoids comprise a fill gas.

2. The actuator of claim 1, wherein the polymer matrix comprises an elastomer.

3. The actuator of claim 1, wherein the sealing layer is configured to retain the fill gas within the actuator.

4. The actuator of claim 1, wherein the sealing layer is configured to inhibit the ingress of contaminants into the actuator.

5. The actuator of claim 1, wherein the sealing layer comprises an elastomer.

6. The actuator of claim 1, wherein the sealing layer comprises at least one of poly(vinyl acetate), poly(vinyl alcohol), poly(ethylene vinyl alcohol), polyurethane, polyvinylidene fluoride, poly-chloro-trifluoroethylene, polyhedral oligomeric silsesquioxane, chloro-fluoropolymers, and aliphatic or semi-aromatic polyamides.

7. The actuator of claim 1, wherein a difference in Hildebrand solubility parameter between the fill gas and the sealing layer is at least 5 $MPa^{1/2}$.

8. The actuator of claim 1, wherein a mechanical stiffness of the sealing layer is less than a mechanical stiffness of the nanovoided polymer layer.

9. The actuator of claim 1, wherein the fill gas comprises at least one of Ar, $N_2$, Kr, Xe, $O_2$, $SF_6$, $CHF_3$, $CF_4$, $C_2F_6$, $C_3F_8$, and air.

10. The actuator of claim 1, wherein a difference in Hildebrand solubility parameter between the nanovoided polymer and the fill gas is less than 2 $MPa^{1/2}$.

11. The actuator of claim 1, further comprising a gas reservoir at least partially encapsulated by the sealing layer.

12. The actuator of claim 11, further comprising a layer of getter material located within the gas reservoir.

13. The actuator of claim 11, wherein at least a portion of the polymer matrix is directly exposed to the gas reservoir.

14. An actuator comprising:
    a primary electrode;
    a secondary electrode overlapping at least a portion of the primary electrode;
    a nanovoided polymer layer disposed between and abutting the primary electrode and the secondary electrode;
    a fill gas located within nanovoids of the nanovoided polymer layer;
    a hermetic sealing layer at least partially encapsulating the nanovoided polymer layer; and
    a gas reservoir located proximate to the nanovoided polymer layer.

15. The actuator of claim 14, wherein the sealing layer comprises an elastomer.

16. The actuator of claim 14, wherein the sealing layer comprises at least one of poly(vinyl acetate), poly(vinyl alcohol), poly(ethylene vinyl alcohol), polyurethane, polyvinylidene fluoride, poly-chloro-trifluoroethylene, polyhedral oligomeric silsesquioxane, chloro-fluoropolymers, and aliphatic or semi-aromatic polyamides.

17. The actuator of claim 14, wherein the nanovoided polymer layer and the gas reservoir are encapsulated by the sealing layer.

18. A method comprising:
    forming an actuator comprising a primary electrode, a secondary electrode overlapping at least a portion of the primary electrode, and a nanovoided polymer layer disposed between and abutting the primary electrode and the secondary electrode;
    introducing a fill gas into nanovoids of the nanovoided polymer layer;
    forming a sealing layer over the nanovoided polymer layer.

19. The method of claim 18, wherein introducing the fill gas into the nanovoids comprises:
    placing the actuator within a vacuum processing chamber prior to forming the sealing layer;
    evacuating the vacuum processing chamber; and
    introducing the fill gas into the vacuum processing chamber.

20. The method of claim 19, wherein the sealing layer is formed within the vacuum processing chamber after introducing the fill gas into the vacuum processing chamber.

* * * * *